United States Patent
Chu et al.

(10) Patent No.: US 12,487,356 B1
(45) Date of Patent: Dec. 2, 2025

(54) METHOD FOR WALL DIRECTION ESTIMATION

(71) Applicant: Amazon Technologies, Inc., Seattle, WA (US)

(72) Inventors: Wai Chung Chu, San Jose, CA (US); Trausti Thor Kristjansson, San Jose, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 18/143,305

(22) Filed: May 4, 2023

(51) Int. Cl.
| | |
|---|---|
| *G01S 15/46* | (2006.01) |
| *G01S 15/00* | (2020.01) |
| *H04R 1/40* | (2006.01) |
| *H04R 3/00* | (2006.01) |

(52) U.S. Cl.
CPC ............ *G01S 15/46* (2013.01); *G01S 15/003* (2013.01); *H04R 1/406* (2013.01); *H04R 3/005* (2013.01); *H04R 2201/401* (2013.01)

(58) Field of Classification Search
CPC ....... G01S 15/46; G01S 15/003; H04R 1/406; H04R 3/005; H04R 2201/401
USPC .................. 381/56, 58, 91, 92, 160
See application file for complete search history.

(56) References Cited

U.S. PATENT DOCUMENTS

| | | | |
|---|---|---|---|
| 5,548,642 A | 8/1996 | Diethorn | |
| 8,160,262 B2 | 4/2012 | Buck et al. | |
| 8,204,248 B2 | 6/2012 | Haulick et al. | |
| 8,811,119 B2 | 8/2014 | Aarts et al. | |
| 9,185,199 B2 | 11/2015 | Zurek et al. | |
| 9,219,460 B2 | 12/2015 | Bush | |
| 9,294,860 B1 | 3/2016 | Carlson | |
| 10,024,712 B2 | 7/2018 | Barjatia | |
| 10,149,048 B1 * | 12/2018 | Stefanakis | ............. H04R 3/005 |
| 10,264,351 B2 | 4/2019 | Choisel et al. | |

(Continued)

FOREIGN PATENT DOCUMENTS

| | | | | |
|---|---|---|---|---|
| EP | 4472244 A1 * | 12/2024 | ............... | H04R 3/00 |
| WO | 2016040324 A1 | 3/2016 | | |

OTHER PUBLICATIONS

U.S. Appl. No. 17/218,274, filed Mar. 31, 2021.
U.S. Appl. No. 18/163,408, filed Feb. 2, 2023.
U.S. Appl. No. 17/852,513, filed Jun. 29, 2022.

*Primary Examiner* — William A Jerez Lora
(74) *Attorney, Agent, or Firm* — Pierce Atwood LLP

(57) ABSTRACT

A system that performs wall direction estimation to determine a position of an acoustically reflective surface relative to a device. For example, the device may detect a direct sound received from an active sound source and a first reflection reflected from a nearby wall. Based on a time delay, the device can estimate a direction and/or distance to the wall. For example, the device determines a time differential of arrival (TDOA) between the direct sound and the first reflection for each microphone in a microphone array. The device combines TDOA values of the entire microphone array into a distance vector, which the device can compare to reference distance data to determine the best wall direction estimate. For example, reference distance values are fixed based on a geometry of the microphone array and the device can identify an azimuth value that is most similar to the distance vector.

20 Claims, 14 Drawing Sheets

(56) References Cited

U.S. PATENT DOCUMENTS

| | | | |
|---|---|---|---|
| 10,598,543 B1* | 3/2020 | Mansour | H04R 1/326 |
| 10,714,117 B2 | 7/2020 | Binder et al. | |
| 10,777,214 B1* | 9/2020 | Shi | H04R 29/001 |
| 10,869,140 B2 | 12/2020 | Falch et al. | |
| 10,895,504 B2 | 1/2021 | Yasuda et al. | |
| 10,959,018 B1 | 3/2021 | Shi et al. | |
| 2011/0317522 A1 | 12/2011 | Florencio et al. | |
| 2014/0180629 A1 | 6/2014 | Dokmanic et al. | |
| 2017/0046124 A1 | 2/2017 | Nostrant | |
| 2020/0225344 A1* | 7/2020 | Yoon | G01N 29/0663 |

* cited by examiner

METHOD FOR WALL DIRECTION ESTIMATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Electronic devices may be used to capture audio data and generate audio. For example, an electronic device may generate audio using loudspeakers and may capture audio data using one or more microphones. If the electronic device is located in the vicinity of hard surfaces (e.g., walls, ceiling, shelves, etc.), the presence of acoustically reflective surfaces negatively impacts performance of the electronic device. For example, the presence of acoustically reflective surfaces can have a negative effect on both speech recognition performance and sound quality, and reflections from the acoustically reflective surfaces can confuse sound source localization. As a result, the device may be unable to accurately locate a user.

To improve a user experience, devices, systems and methods are disclosed that perform wall direction estimation to determine a position of an acoustically reflective surface relative to a device. For example, the device may detect a direct sound received from an active sound source and a first reflection reflected from a nearby wall. Based on a time delay, the device can estimate a direction and/or distance to the wall. For example, the device determines a time differential of arrival (TDOA) between the direct sound and the first reflection for each microphone in a microphone array. The device combines TDOA values of the entire microphone array into a distance vector, which the device can compare to reference distances to determine the best wall direction estimate. For example, the reference distances are fixed based on a geometry of the microphone array and the device can identify an azimuth value that is most similar to the distance vector.

By performing wall direction estimation, the device may determine position(s) of acoustically reflective surface(s) relative to the device and modify audio settings and/or perform sound source localization based on the position(s). For example, if the device knows the direction of nearby walls, the device can avoid localizing in that direction, can modify equalization settings to improve output audio, and/or the like. Additionally or alternatively, the device may ignore reflections associated with the acoustically reflective surface(s) and perform an action responsive to the sound source itself, such as by rotating towards a direction associated with the sound source, controlling visual indicators (e.g., lights) to indicate the direction of the sound source, and/or the like.

Figure 1:
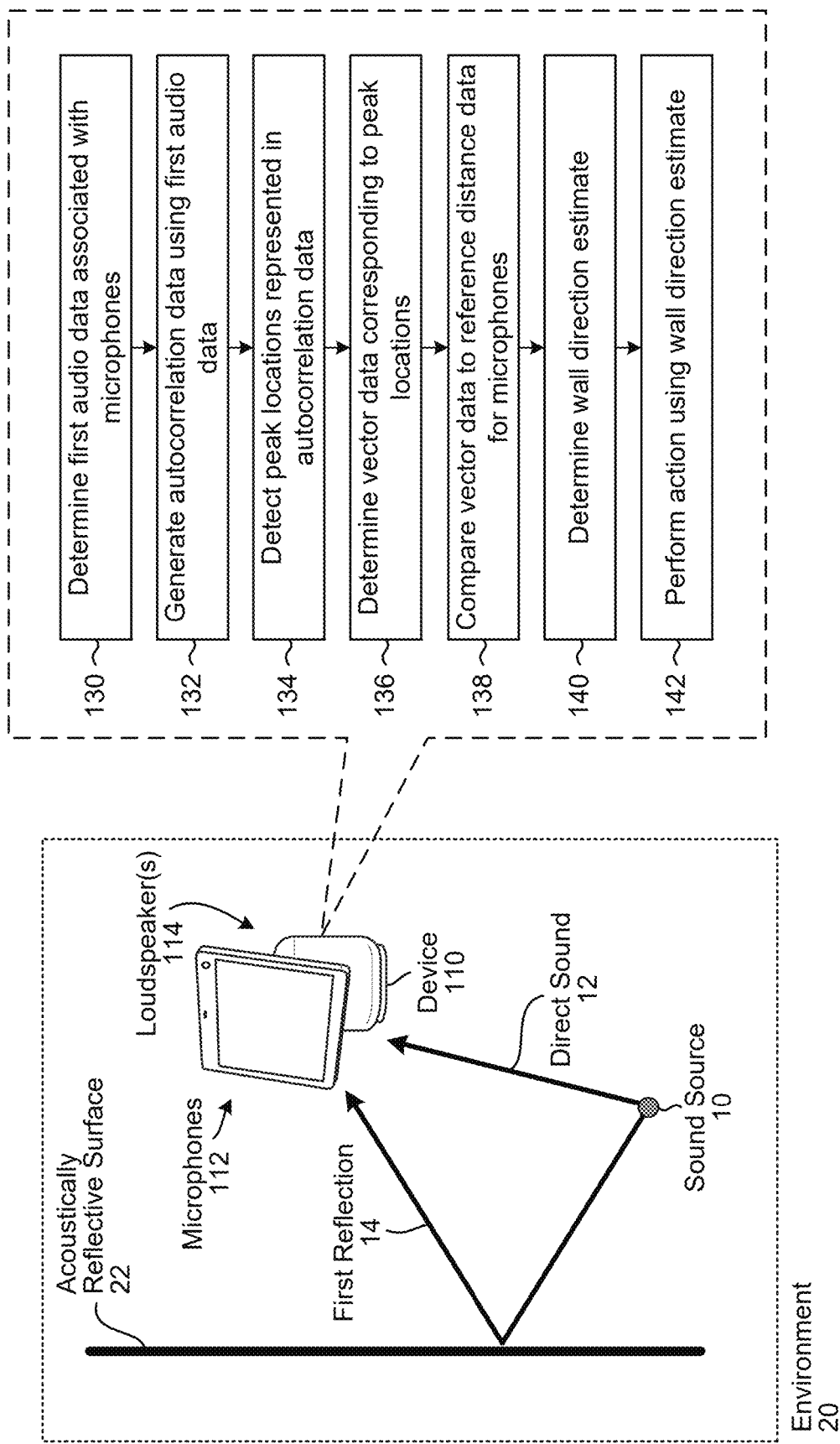
FIG. 1 illustrates a system for performing wall direction estimation according to embodiments of the present disclosure.

FIG. 1 illustrates a system for performing wall direction estimation using a device according to embodiments of the present disclosure. As illustrated in FIG. 1, a system 100 may include a device 110 that has multiple microphones 112 and one or more loudspeaker(s) 114. To detect user speech or other audio, the device 110 may use the microphones 112 to generate microphone audio data that captures audio in a room (e.g., an environment) in which the device 110 is located. As is known and as used herein, "capturing" an audio signal includes a microphone transducing audio waves (e.g., sound waves) of captured sound to an electrical signal and a codec digitizing the signal to generate the microphone audio data.

In some examples, the microphones 112 may be included in a microphone array, such as an array of eight microphones. However, the disclosure is not limited thereto and the device 110 may include any number of microphones 112 without departing from the disclosure. In some examples, the device 110 may process the user speech to determine a voice command input by a user. In response to the voice command, the device 110 may perform an action and/or generate output audio. For example, the device 110 may send playback audio data to the loudspeaker(s) 114 and the loudspeaker(s) 114 may generate audible sound(s) based on the playback audio data.

As illustrated in FIG. 1, the device 110 may perform wall direction estimation to detect one or more walls (e.g., acoustically reflective surface 22) that are in proximity to the device 110 in the environment 20 and/or to determine a distance to the wall(s). For example, a sound source 10 may generate audible sound(s) and the device 110 may perform wall direction estimation based on a time delay between the audible sound(s) and acoustic reflections of the audible sound(s).

To illustrate an example, incident sound waves associated with the audible sound(s) (e.g., direct sound 12) may propagate through the air in a first direction (e.g., toward the device 110) until they reach the device 110 and are detected by the microphones 112. Separately, the incident sound waves may propagate through the air in a second direction (e.g., towards the acoustically reflective surface 22) until they reach the acoustically reflective surface 22 (e.g., first wall), at which point first reflected sound waves (e.g., first reflections 14) may be reflected by the first wall and propagate through the air until being detected by the microphones 112.

While not illustrated in FIG. 1, the incident sound waves may also propagate through the air in a third direction (e.g., toward a second wall) until they reach the second wall, at which point second reflected sound waves may be reflected by the second wall and propagate through the air until being detected the microphones 112. Thus, the device 110 may detect first reflected sound waves associated with the first wall and may detect second reflected sound waves associated with the second wall, although the disclosure is not limited thereto.

When the sound source 10 generates the audible sounds at a first time, the microphones 112 may detect strong original sound waves (e.g., incident sound waves) at a second time after the first time, which may be referred to as the direct sound 12. If the device 110 is located in a center of a relatively large room (e.g., relatively large distance between the device 110 and a nearest acoustically reflective surface 22), there may be a lengthy time delay before a third time that the microphones 112 detects reflected sound waves that are reflected by the acoustically reflective surface, which may be referred to as the first reflection 14. As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphones 112 detect the reflected sound waves at the third time and the reflected sound waves may be stronger in comparison to the incident sound waves.

Based on the time delay between the second time and the third time, the device 110 may determine an estimated direction of the acoustically reflective surface 22 relative to the device 110. In addition, a time delay of a reflection is proportional to a distance traveled by the reflected sound waves, which enables the device 110 to estimate a distance between the device 110 and the acoustically reflective surface 22. For example, based on the time delay associated with an individual reflection, the device 110 may determine a distance from the device 110 to a candidate wall corresponding to the reflection.

By performing wall direction estimation, the device may determine a direction and/or distance associated with the acoustically reflective surface 22 relative to the device, enabling the device 110 to modify audio settings and/or improve sound source localization. For example, if the device 110 knows the direction associated with a nearby wall, the device 110 can avoid localizing in that direction, can modify equalization settings to improve output audio, and/or the like. Additionally or alternatively, the device 110 may ignore acoustic reflections generated by the nearby wall and perform an action responsive to a direction of the sound source itself, such as by rotating towards the direction associated with the sound source, controlling visual indicators (e.g., lights) to indicate the direction of the sound source, and/or the like.

When look directions and beam coefficients of a beamformer of the device 110 are fixed, the device 110 needs to decide which beam to select for speech recognition. Generally, the goal is to select the beam that points in the direction of a user speaking (e.g., speech direction). A typical approach is to estimate the per-beam signal-to-noise ratio (SNR) and pick the beam with the highest signal-to-noise ratio. While this approach is simple, it does not take into account walls in the vicinity of the device 110, which result in reflections. For example, when the device 110 is placed in the vicinity of a wall, the SNR is no longer a good proxy to estimate a speech direction since reflections from the wall may have approximately the same power as the direct sound. Depending on the angle of incidence and the beam look directions, the signal power of a beam pointing towards the wall may be larger than that of the beam pointing in the speech direction.

However, knowing a direction and/or distance of the nearest wall to the device 110, along with a relative location of the wall and/or the device 110, enables the device 110 to disqualify look directions pointing towards the wall and focus beams onto the relevant half-plane (or quarter-plane when the device 110 is positioned in a corner). In some examples, the device 110 may disqualify (e.g., ignore) beams pointing towards a wall, reducing a number of beams from which to select. Additionally or alternatively, the device 110 may redirect the beams to ignore look directions pointing towards the wall, increasing an angular resolution of the beamformer (e.g., each beam is associated with a smaller angle and is therefore more focused).

In addition, performing wall direction estimation may be beneficial for a variety of other applications, including improving the sound quality of output audio generated by the device 110, improving echo cancellation for speech recognition, and/or the like. For example, the device 110 may improve sound equalization prior to generating the output audio, taking into account acoustic characteristics of the room to improve the sound quality of the output audio. To illustrate an example, if the device 110 is positioned in a corner of the room the output audio may be perceived as having too much bass, whereas if the device 110 is positioned on an island in the middle of the room the output audio may be perceived as having too little bass. Thus, the device 110 may perform dynamic sound equalization to generate consistent output audio regardless of a position of the device 110 relative to acoustically reflective surfaces. However, the disclosure is not limited thereto and the device 110 may perform wall direction estimation to improve fixed-beamformer selection, environment-adaptive beamforming, beam selection, device arbitration, echo cancellation, and/or the like without departing from the disclosure.

As illustrated in FIG. 1, the device 110 may perform wall direction estimation when a sound source 10 generates an audible sound. For example, the sound source 10 may generate an audible sound that is omnidirectional, such that incident sounds waves associated with the audible sound propagate through the air in all directions. Some of the incident sound waves (e.g., direct sound 12) may take a direct path from the sound source 10 to the device 110 and may be detected by the microphones 112 of the device 110 at a first time. However, some of the incident sound waves may reach a wall (e.g., acoustically reflective surface 22) and the wall may generate reflected sound waves (e.g., first reflection 14) that propagate through the air until being detected by the microphones 112 at a second time.

As illustrated in FIG. 1, the device 110 may determine (130) first audio data associated with the microphones 112. For example, the first audio data may include a representation of the direct sound 12 (e.g., incident sound waves traveling along a direct path between the sound source 10 and the device 110) and a representation of first reflections 14 (e.g., acoustic reflections). The first audio data may be multichannel audio that includes an individual microphone channel for each microphone 112 included in the microphone array.

In some examples, the microphones 112 may be configured to generate input audio data and an audio processing component may be configured to perform audio processing on the input audio data to determine the first audio data. For example, the audio processing component may be configured to synchronize a first portion of the first audio data (e.g., first channel) corresponding to a first microphone 112a with a second portion of the first audio data (e.g., second channel) corresponding to a second microphone 112b. In addition to synchronizing each of the individual microphone channels included in the first audio data, the audio processing component may perform additional audio processing such as echo cancellation, noise suppression, and/or the like, although the disclosure is not limited thereto.

As described in greater detail below with regard to FIG. 4, the device 110 may generate (132) autocorrelation data using the first audio data, may detect (134) peak locations represented in the autocorrelation data, and may determine (136) vector data corresponding to the peak locations. For example, the device 110 may perform an autocorrelation operation by determining a correlation between an individual microphone channel and a delayed version of itself (e.g., the individual microphone channel). Thus, the autocorrelation operation determines a correlation of the microphone channel with a delayed copy of itself as a function of delay, which enables the device 110 to detect repeating patterns. In this example, the repeating pattern corresponds to the direct sound and the first reflection, such that the device 110 may detect a peak correlation that indicates a round-trip time needed for a sound wave to start at the microphone 112, reach the wall and be reflected back to the microphone 112. This round-trip time is proportional to the distance from the microphone to the wall, such that the peak correlation can be used to determine a distance value associated with the microphone.

For each autocorrelation sequence, the device 110 may detect a unique peak location and corresponding value, which the device 110 may store as an entry in the vector data corresponding to the peak locations. For example, a first value of the vector data may correspond to a first peak represented in first autocorrelation data associated with a first microphone 112a, a second value of the vector data may correspond to a second peak represented in second autocorrelation data associated with a second microphone 112b, and so on for each microphone included in the microphone array.

The device 110 may compare (138) the vector data to reference distance data (e.g., reference data) for the microphones 112 and may determine (140) a wall direction estimate. For example, reference distance values may be specific to a microphone array associated with the device 110 and the device 110 may use the reference distance data to determine a reference distance value for each microphone at each azimuth value. By identifying a set of reference distance values that are most similar to the vector data determined in step 136, the device 110 may associate a corresponding azimuth value with the acoustically reflective surface 22. For example, the device 110 may calculate mean squared error values using the vector data and the reference distance data and perform error minimization to determine a minimum mean squared error value, which indicates an azimuth value corresponding to a portion of the acoustically reflective surface 22 that is closest to the device 110.

While the example described above refers to determining the mean squared error values and performing a minimization operation to determine the azimuth value corresponding to the acoustically reflective surface 22, the disclosure is not limited thereto. For example, the device 110 may perform other operations to determine the azimuth value corresponding to the acoustically reflective surface 22 without departing from the disclosure. In some examples, the device 110 may determine a difference between the vector data and the reference distance data without using the mean squared error without departing from the disclosure. In other examples, the device 110 is not limited to performing error minimization and may perform other optimization operations without departing from the disclosure. Additionally or alternatively, the device 110 may use a lookup table and/or a probabilistic process to determine the azimuth value without departing from the disclosure.

Finally, the device 110 may perform (142) an action using the wall direction estimate. For example, the device 110 may use the wall direction estimate to improve sound source localization and ignore acoustic reflections corresponding to the acoustically reflective surface 22, enabling the device 110 to accurately determine a direction of the sound source 10. Using this direction, the device 110 may rotate towards the sound source, control visual indicators (e.g., lights) to indicate the direction of the sound source, generate audio data directed towards the sound source 10, and/or the like, although the disclosure is not limited thereto.

While the description of FIG. 1 refers to an example of the device 110 performing wall direction estimation by capturing audible sounds generated by the sound source 10, the disclosure is not limited thereto. For example, the device 110 may perform wall direction estimation by causing an external loudspeaker to generate an audible sound and capturing the direct sound waves and the reflected sound waves using the microphones 112. Additionally or alternatively, the device 110 may use a transducer or other sensor without departing from the disclosure. Thus, while the description refers to a specific example involving the microphones 112 capturing audible sounds, the techniques described herein may be applied to a transducer and/or other components without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

For ease of explanation, the following descriptions may refer to the device 110 being located in a "room" and detecting walls associated with the room. However, the disclosure is not limited thereto and the device 110 may be located in an "environment" or "location" (e.g., concert hall, theater, outdoor theater, outdoor area, etc.) without departing from the disclosure.

For ease of explanation, the following descriptions may refer to a "wall" or "candidate wall" in order to provide a clear illustration of one or more techniques for estimating a distance and/or direction associated with an acoustically reflective surface. However, this is intended to provide a simplified example and the disclosure is not limited thereto. Instead, techniques used by the device 110 to estimate a distance and/or direction associated with a candidate wall may be applied to other acoustically reflective surfaces without departing from the present disclosure. Thus, while the following description may refer to techniques for determining a distance and/or direction associated with a candidate wall, one of skill in the art may apply the disclosed techniques to estimate a distance and/or direction associated with any acoustically reflective surface (e.g., ceiling, floor, object, etc.).

If the device 110 includes a single loudspeaker 114, an acoustic echo canceller (AEC) may perform acoustic echo cancellation for one or more microphones 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure.

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortion-less Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphones. For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphones 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones 112 are combined in such a way that signals from a particular direction experience constructive interference, while signals from other directions experience destructive interference. The parameters used in beamforming may be varied to dynamically select different directions, even when using a fixed-configuration microphone array.

Figure 2:
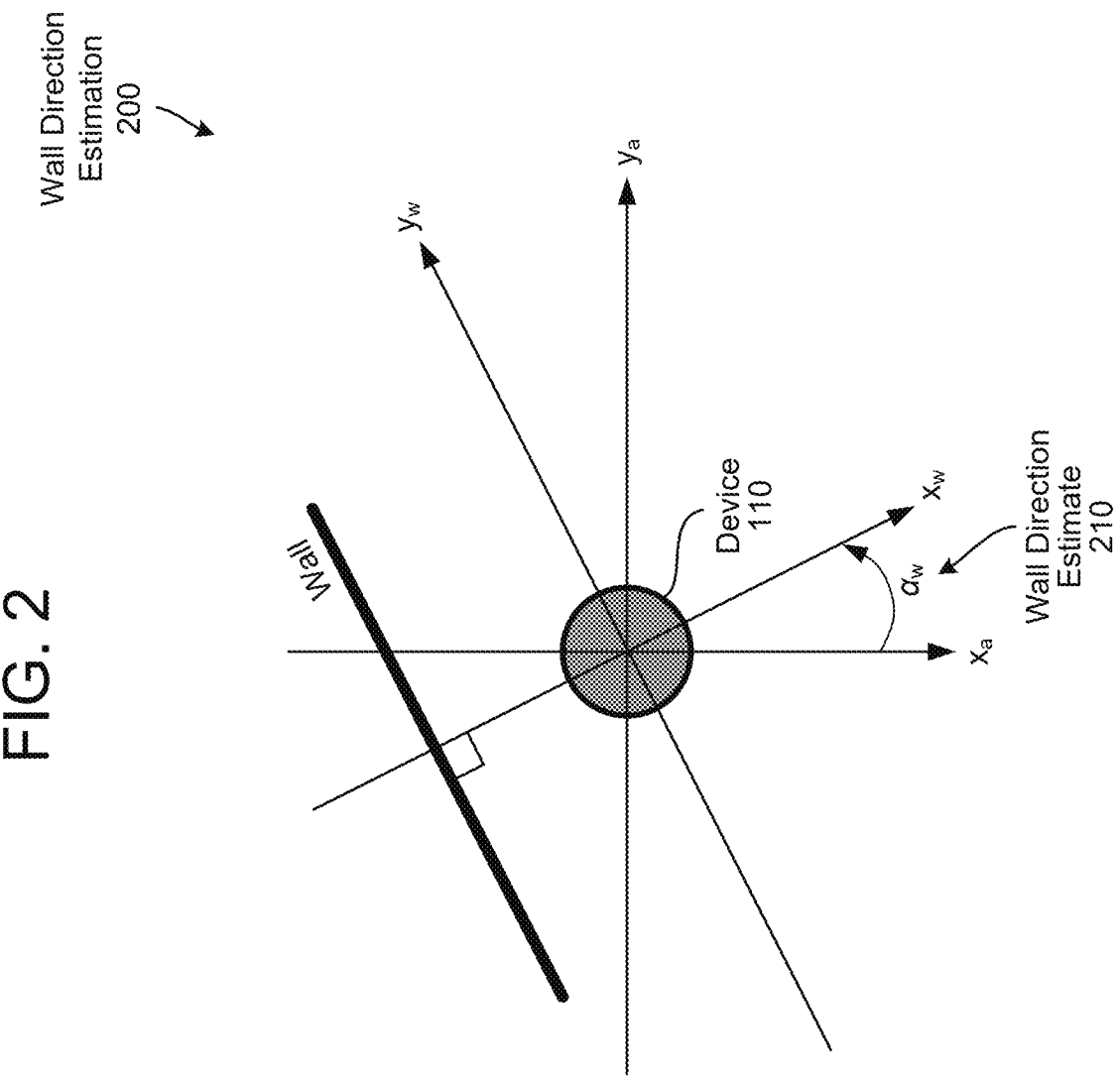
FIG. 2 illustrates an example of performing wall direction estimation according to embodiments of the present disclosure.

FIG. 2 illustrates an example of performing wall direction estimation according to embodiments of the present disclosure. In wall direction estimation example 200 illustrated in FIG. 2, the device 110 includes a microphone array and is located at the origin of the array coordinate system $\{x_a, y_a\}$. As illustrated in FIG. 2, a wall is positioned near the device 110 and a wall coordinate system $\{x_w, y_w\}$ can be found so that the wall is perpendicular to the $x_w$ axis and located at negative $x_w$. Using this framework, the device 110 may determine an estimated azimuth $\alpha_w$ between the two coordinate systems. For example, the device 110 may determine the estimated azimuth $\alpha_w$ that indicates a shortest distance between the device 110 and the wall, as described in greater detail below.

Figure 3:
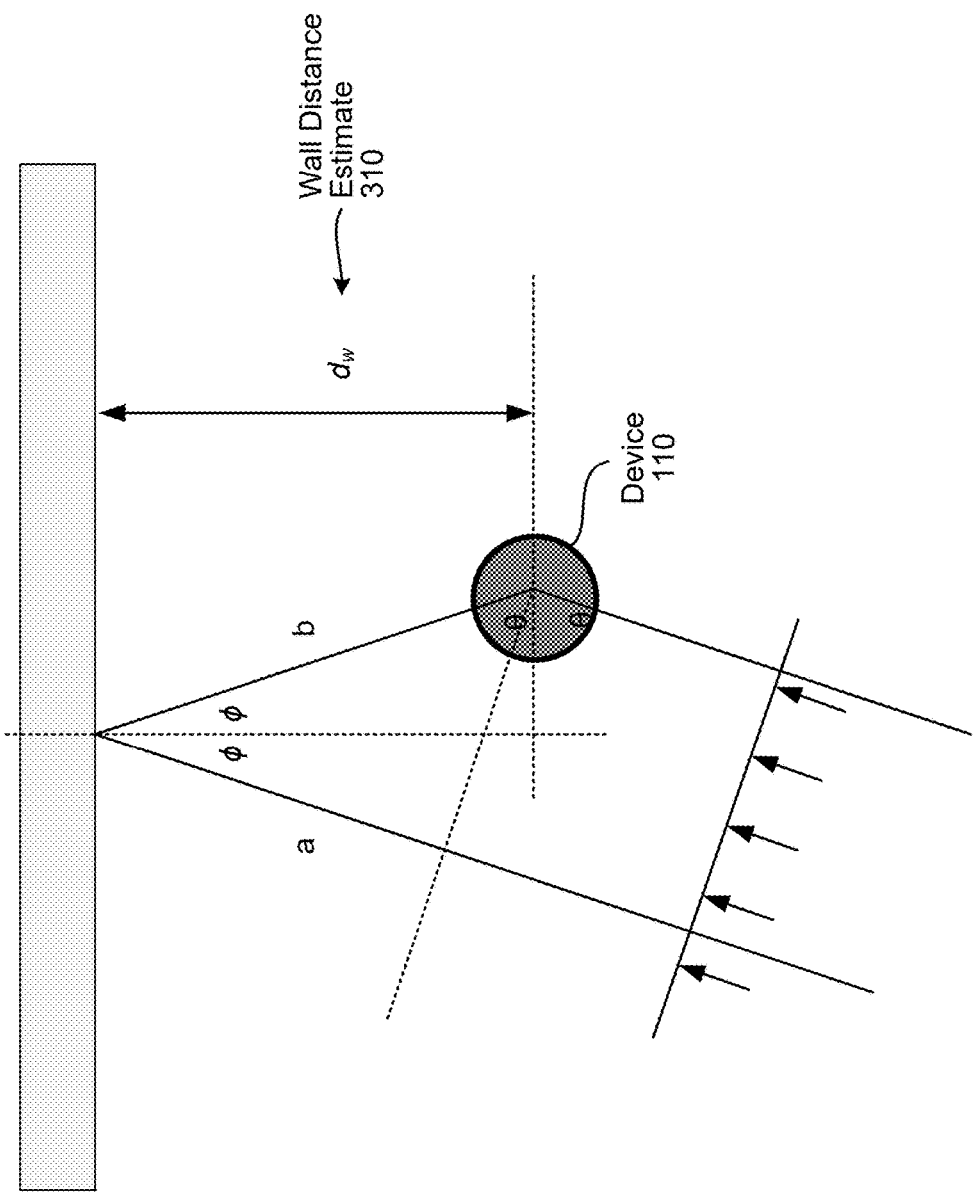
FIG. 3 illustrates an example of performing wall distance estimation according to embodiments of the present disclosure.

FIG. 3 illustrates an example of performing wall distance estimation according to embodiments of the present disclosure. In some examples, in addition to determining the estimated azimuth $\alpha_w$, the device 110 may optionally determine a distance between the device 110 and the wall. As illustrated in FIG. 3, wall distance estimation 300 depicts how the device 110 may determine wall distance estimate 310 (e.g., $d_w$) based on relative angles of the direct sound and the first reflection detected by the device 110. In addition to these relative angles, the device 110 may determine the wall distance estimate 310 by calculating a time delay between the direct sound and the first reflection, as described in greater detail below.

As illustrated in FIG. 3, the device 110 may be configured to identify a first direction associated with direct sound received from a sound source and a second direction associated with a first reflection that is reflected off of the wall. When the device 110 is close to the wall, the direct sound and the first reflection have a similar signal strength. As illustrated in FIG. 3, an angle offset between the direct path and the first reflection can be defined as 2θ. For example, a first angle (e.g., θ) between a horizontal axis of the device 110 and the direct sound in a counter-clockwise direction is equal to a second angle (e.g., θ) between the horizontal axis and the first reflection in a clockwise direction.

Additionally, from the perspective of a reflection point on the wall (e.g., where the first reflection originates), a reflection angle between direct sound waves received from the sound source and reflected sound waves reflected toward the device 110 can be defined as 2φ. For example, a third angle (e.g., #) between a vertical line (e.g., bisecting the reflection angle), and the sound source in the counter-clockwise direction is equal to a fourth angle (e.g., #) between the vertical line and the device 110 in the clockwise direction.

The device 110 may be configured to disambiguate between the direct sound (e.g., direct path) and the first reflection (e.g., reflected path), which enables the device 110 to estimate a time delay Δt. Under ideal conditions, the first reflection (e.g., reflected signal) arrives at the device 110 seconds after the direct sound associated with the direct path. The device 110 may measure and compute the additional distance that the reflected sound travels:

$$\Delta d = c \cdot \Delta t \qquad [1]$$

where is the speed of sound. Additionally, the incident wave angle is equal to the reflected wave angle for the wall (e.g., φincident=φreflected). Thus, the additional distance can be calculated as Δd=a+b.

The device 110 is configured to identify a first vector corresponding to the direct path and a second vector corresponding to the first refection. As described above, the angle offset between the incident planar wave and the reflected planar wave is 2θ. For example, a direct sound angle corresponding to the sound source is equal to a first reflection angle corresponding to the wall (e.g., θdirect=θreflected). Thus, the device 110 may compute the distance and/or direction of the wall.

The example illustrated in FIG. 3 only applies when the total angle is less than 180 degrees (e.g., θ<π/2). In the example illustrated in FIG. 3, φ=π/2−θ. If the total angle is greater than 90 degrees (e.g., θ>π/4), then the distance to the wall is:

$$d_w = c \cdot \Delta t \frac{\sin(\theta)}{\cos(2\phi)+1} \qquad [2]$$

If the distance to the wall and the angle of incidence are known, the device 110 may calculate the delay of the reflected copy as:

$$\Delta t = c \cdot \Delta d = c \cdot d_w \cdot \frac{\cos(2\phi)+1}{\sin(\theta)} \qquad [3]$$

Alternatively, if the total angle is between 0 and 90 degrees (e.g., $\pi/4 > \theta > 0$), then:

$$dw = c \cdot \Delta t \frac{\sin(\theta)}{1 - \cos(2\theta)} \quad [4]$$

Figure 4:
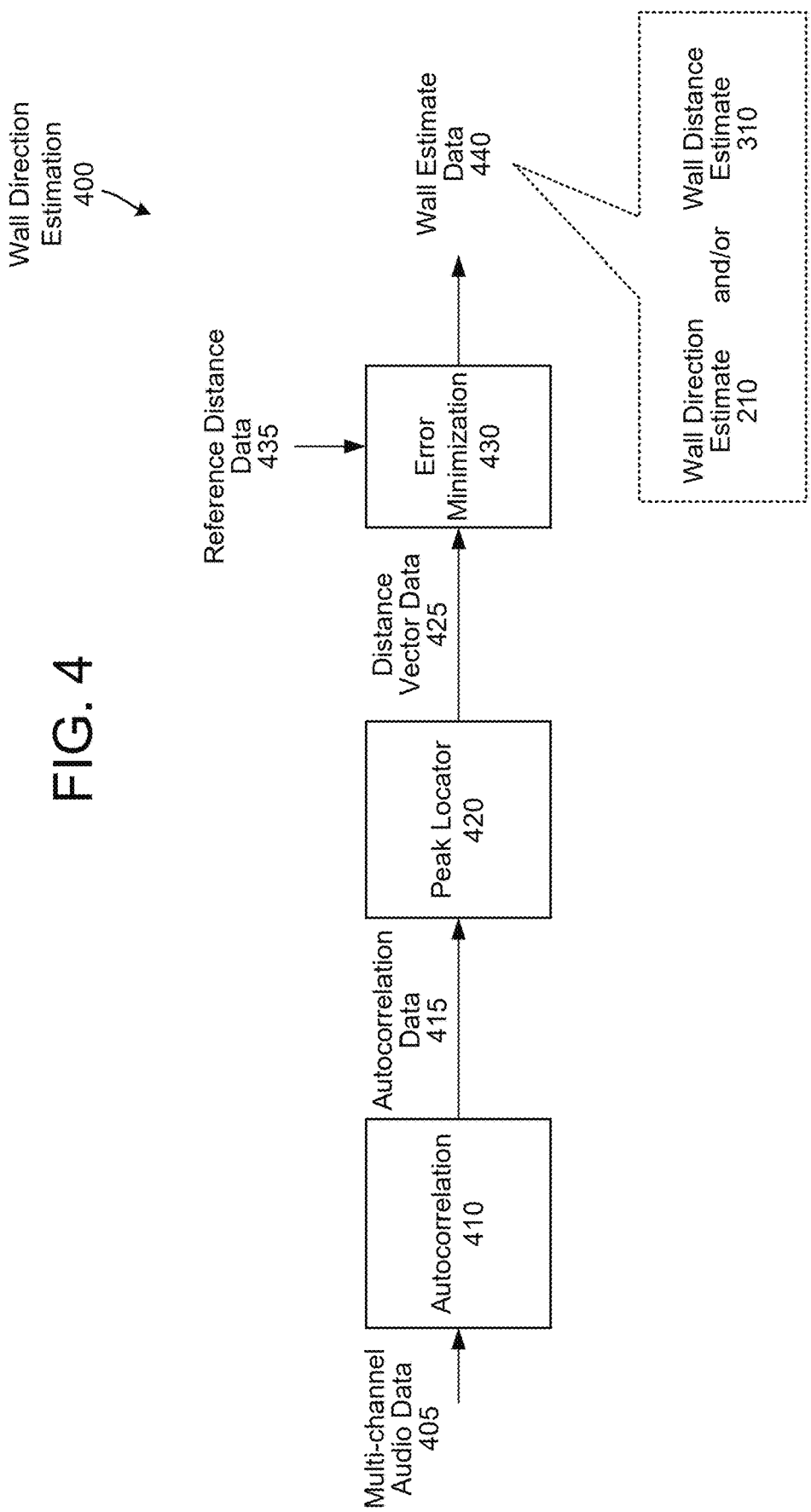
FIG. 4 illustrates a component diagram for performing wall direction estimation according to embodiments of the present disclosure.

FIG. 4 illustrates a component diagram for performing wall direction estimation according to embodiments of the present disclosure. As illustrated in FIG. 4, the device 110 may perform wall direction estimation 400 to determine wall estimate data, which may include the wall azimuth $\alpha_w$ and/or the wall distance $d_w$ described above with regard to FIGS. 2-3. As illustrated in FIG. 4, the device 110 may perform wall direction estimation 400 using an autocorrelation component 410, a peak locator component 420, and an error minimization component 430.

The autocorrelation component 410 receives multi-channel audio signals (e.g., multi-channel audio data 405), which are denoted by:

$$s[i,n], i=0 \text{ to } K-1, n=0 \text{ to } N-1 \quad [5]$$

with K the number of microphones or channels, and N the number of samples to use in each frame. While not illustrated in FIG. 4, the device 110 may apply pre-processing steps using additional components prior to the autocorrelation component 410 receiving the multi-channel audio data 405. For example, the device 110 may perform pre-processing steps such as resampling, filtering, equalization, noise reduction, and/or the like, although the disclosure is not limited thereto. The autocorrelation component 410 may perform autocorrelation in the frequency domain using a phase transform (PHAT), where:

$$S_{ii}[k] = \frac{S[i,k]S^*[i,k]}{\max(S_{sum}[k], \delta)}, i = 0 \text{ to } K-1, k = 0 \text{ to } N-1 \quad [6]$$

are the normalized power spectral density (PSD) functions (e.g., PSDs), with $\delta$ a small positive value to avoid division by zero, and:

$$S[i,k] \overset{DFT}{\longleftrightarrow} s[i,n], i = 0 \text{ to } K-1, k = 0 \text{ to } N-1 \quad [7]$$

$$S_{sum}[k] = \Sigma_i |S[i,k]S^*[i,k]|, k=0 \text{ to } N-1 \quad [8]$$

The autocorrelation sequences are:

$$S_{ii}[k] \overset{DFT}{\longleftrightarrow} R_i[l], i = 0 \text{ to } K-1 \quad [9]$$

Thus, the autocorrelation sequence indicates a correlation between an individual microphone channel and a delayed version of itself (e.g., the individual microphone channel). For example, the autocorrelation operation determines a correlation of the microphone channel with a delayed copy of itself as a function of delay, which enables the device 110 to detect repeating patterns. In this example, the repeating pattern corresponds to the direct sound and the first reflection, such that the device 110 may detect a peak correlation that indicates a round-trip time needed for a sound wave to start at the microphone 112, reach the wall and be reflected back to the microphone. In some examples, prior to performing the Inverse Discrete Fourier Transform (IDFT), the device 110 may apply a special weighting sequence to $S_{ii}$, such as Gaussian filtering, to smooth the autocorrelation sequences in the frequency domain.

The device 110 may normalize the autocorrelation sequences with division by $R_i[0]$ so that the resultant sequences have a value of 1 at lag 0. In some examples, the energy and autocorrelation values may optionally be smoothed from frame-to-frame. For example, the total energy of an audio frame may be calculated using all samples from all microphone channels, with the smoothed energy formed using two constants. Similarly, the device 110 may smooth the autocorrelation sequences using a similar scheme, which may reduce and/or suppress temporal disturbances. As illustrated in FIG. 4, the autocorrelation component 410 may output autocorrelation data 415 corresponding to the smoothed autocorrelation sequences.

After calculating the smoothed autocorrelation sequences (e.g., autocorrelation data 415), the device 110 may locate the peaks within the interval of interest. Assuming that the wall range (e.g., distance from center of the microphone array to the wall) is [10 cm, 50 cm], then the time range is [0.1/342, 0.5/342]=[0.2924 ms, 1.462 ms], where c=342 m/s is the speed of sound. For discrete-time processing using a first sampling rate (e.g., 16 kHz sampling rate), the time range becomes [0.2924*16000, 1.462*16000]≈[5, 23], whereas discrete-time processing using a second sampling rate (e.g., 48 kHz sampling rate) results in the time range becoming [0.2924*48000, 1.462*48000]≠[14, 70]. Thus, if the microphones 112 use the second sampling rate, the device 110 may locate the peaks between a first sample (e.g., 14) and a second sample (e.g., 70), which represents the interval of interest (e.g., time window).

As illustrated in FIG. 4, the peak locator component 420 may receive the autocorrelation data 415 and generate distance vector data 425. For example, the peak locator component 420 may locate the largest autocorrelation peak within a time range (e.g., interval of interest), with the results denoted by:

$$\text{peakLag}[i], \text{peakCorr}[i], i=0 \text{ to } K-1 \quad [10]$$

where peakLag[i] denotes vector data for the microphone array, i denotes an individual microphone of the microphone array, and peakCorr is a correlation value at the time lag peakLag.

Figure 5:
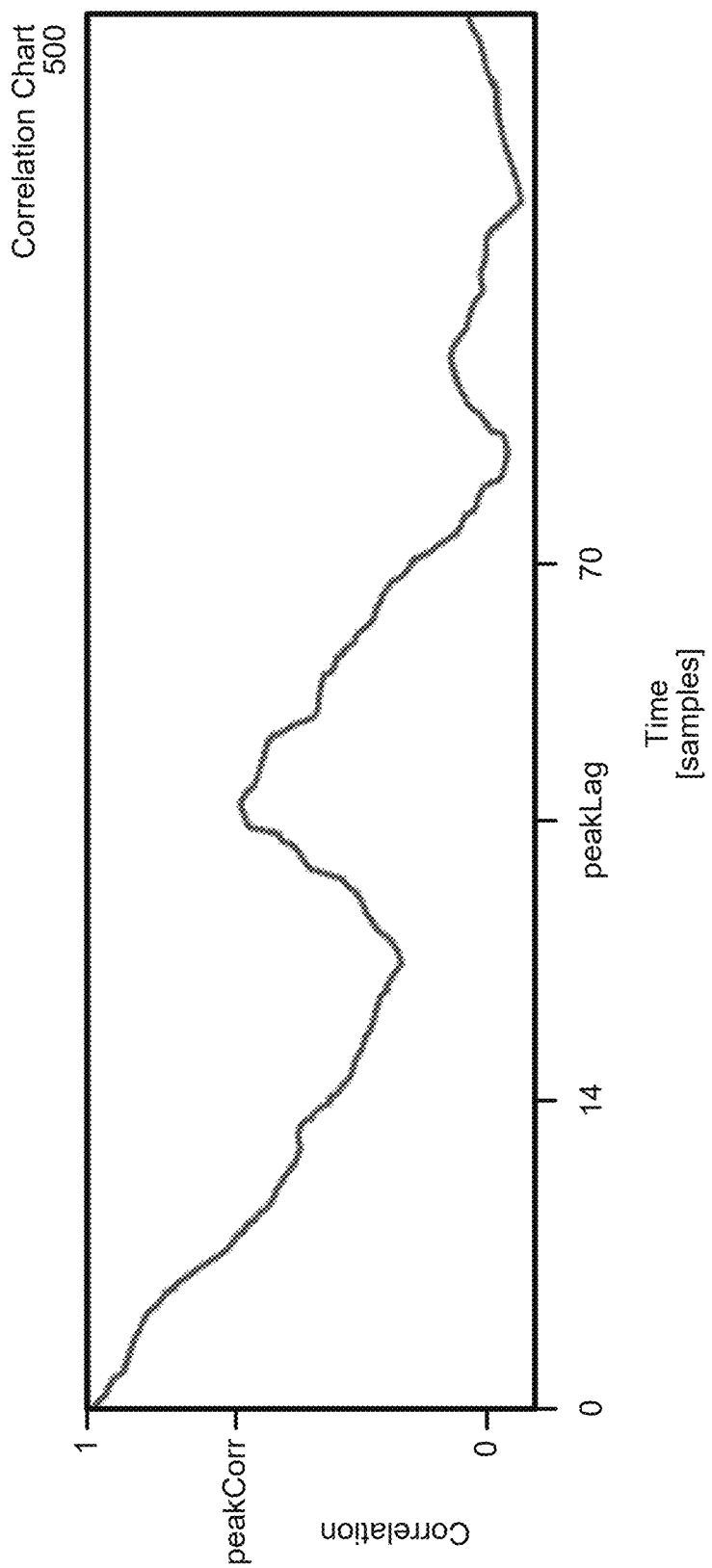
FIG. 5 illustrates an example of correlation data according to embodiments of the present disclosure.

FIG. 5 illustrates an example of correlation data according to embodiments of the present disclosure. As illustrated in FIG. 5, the device 110 may determine a peak correlation value (e.g., peakCorr) and corresponding peak location value (e.g., peakLag) for an individual autocorrelation sequence (e.g., individual microphone channel). Thus, the peak locator component 420 may separately process each autocorrelation sequence associated with an individual microphone channel, such that the number of peak correlation values and corresponding peak location values is equal to the number of microphones included in the microphone array.

As illustrated in FIG. 5, the correlation chart 500 illustrates an example using a first sampling rate (e.g., 48 kHz sampling rate), which corresponds to a first interval of interest (e.g., peaks are located between sample 14 and sample 70). As described above, the device 110 may instead use using a second sampling rate (e.g., 16 kHz sampling rate), which corresponds to a second interval of interest (e.g., peaks are located between sample 5 and sample 23). However, the disclosure is not limited thereto and the sampling rate may vary without departing from the disclosure.

Referring back to FIG. 4, the peak locator component 420 may process the autocorrelation data 415 to generate distance vector data 425. For example, the vector data (e.g., sequence peakLag[i], i=0 to K−1) calculated in Equation [10] corresponds to discrete time quantities (e.g., integers), where peakLag[i] indicates the round-trip time (which is measured in samples) needed for a sound wave to start at the ith microphone, reach the wall, and then bounce back and be detected by the same microphone. The round-trip time is proportional to the wall distance de from the microphone 112 to the wall, and hence the entire peakLag sequence can be interpreted as a K-dimensional distance vector.

As the microphone array of the device 110 has a fixed configuration of microphones 112, and microphone coordinates and/or relative distances between the microphones 112 are known, the K-dimensional distance vector enables the device 110 to determine an orientation of the microphone array relative to the nearest wall. For example, each unique K-dimensional distance vector corresponds to a single orientation of the device 110, enabling the device 110 to identify the direction of the wall relative to the device 110 (e.g., wall azimuth $\alpha_w$). To simplify this calculation, the device 110 may be associated with reference distance values specific to the microphone array, which may be used to determine a specific distance vector corresponding to a particular azimuth value. By comparing the distance vector derived from the autocorrelation sequences (e.g., distance vector data 425) to the reference distance values, the device 110 may estimate the direction of the wall.

As illustrated in FIG. 4, the error minimization component 430 may receive the distance vector data 425 and may determine wall estimate data 440. For example, the error minimization component 430 may perform error minimization using reference distance data 435 to determine the wall direction estimate 210 described above with regard to FIG. 2. Additionally or alternatively, the error minimization component 430 may determine the wall distance estimate 310 described above with regard to FIG. 3.

While the example illustrated in FIG. 4 refers to the error minimization component 430 determining the mean squared error values and performing a minimization operation to determine the wall estimate data 440, the disclosure is not limited thereto. For example, the device 110 may perform other operations to determine the wall estimate data 440 without departing from the disclosure. In some examples, the device 110 may determine a difference between the distance vector data 425 and the reference distance data 435 without using the mean squared error without departing from the disclosure. In other examples, the device 110 is not limited to performing error minimization and may perform other optimization operations to determine the wall estimate data 440 without departing from the disclosure. Additionally or alternatively, the device 110 may use a lookup table and/or a probabilistic process to determine the wall estimate data 440 without departing from the disclosure.

Figure 6:
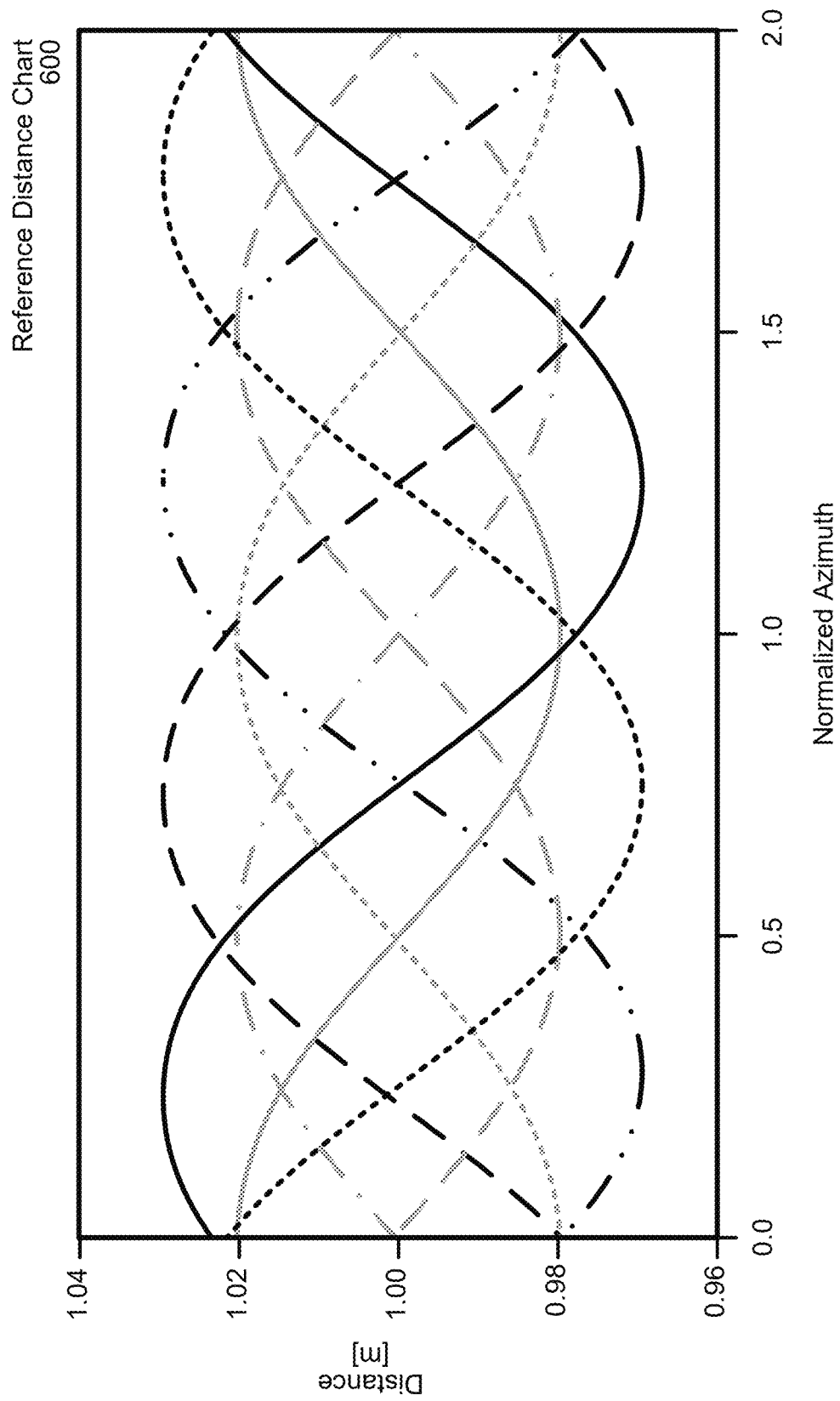
FIG. 6 illustrates examples of reference distance curves according to embodiments of the present disclosure.

FIG. 6 illustrates examples of reference distance curves according to embodiments of the present disclosure. As described in greater detail above, an ith microphone may correspond to specific coordinates $[x_i, y_i]$. Based on a geometry of the microphone array, the device 110 may generate reference distance curves by calculating a distance of a wall relative to the ith microphone using a constant radius (e.g., r=1) at azimuth $a_w$ Î [0, 2p). Example reference distance curves are shown in reference distance chart 600, although the disclosure is not limited thereto. As illustrated in FIG. 6, the vertical axis of the reference distance chart 600 indicates a distance from the ith microphone to the wall measured in meters, while the horizontal axis indicates an azimuth value (e.g., wall direction) from 0 to $2\pi$ normalized to [0, 2].

While the reference distance chart 600 illustrates examples using a first distance from the device 110 to the wall (e.g., r=1), this is intended to conceptually illustrate a simple example and the disclosure is not limited thereto. In some examples, the device 110 may normalize the actual distance value to the first distance. However, the disclosure is not limited thereto, and in other examples the device 110 may determine the reference distance curves using relative distances centered around a distance of zero without departing from the disclosure. Additionally or alternatively, while the horizontal axis is illustrated as a normalized azimuth value (e.g., [0, 2]), the disclosure is not limited thereto and the azimuth value may be represented using integer values (e.g., from 0° to 360°) without departing from the disclosure.

The quantities distance(i, $\alpha_w$) may be referred to as reference distance curves and depend on the microphone coordinates $[x_i, y_i,]$. For example, the reference distance curves correspond to a set of reference distance values, which may be represented as a K-dimensional reference distance vector, for each azimuth value ($\alpha_w$). As used herein, the reference distance data (e.g., reference data) may correspond to the reference distance curves, a plurality of reference distance vectors, the reference distance values, a lookup table including the reference distance values or vectors, and/or the like without departing from the disclosure. While FIG. 6 illustrates example reference distance curves that correspond to the device 110 including eight microphones 112, the disclosure is not limited thereto and the number of microphones 112 may vary without departing from the disclosure.

In order to compare the distance vector consisting of the peakLag sequence to the reference distance data, the device 110 may calculate mean squared error (MSE) values between the reference distance data and the distance vector for the entire range of azimuth. For example, the device 110 may calculate the MSE values using the following equations:

$$num(\alpha) = \sum_{i=0}^{K-1} \text{distance}(i, \alpha) peakLag[i] \qquad [11]$$

$$\text{den} = \sum_{i=0}^{K-1} peakLag[i]^2 \qquad [12]$$

$$mse(\alpha) = \frac{1}{K} \sum_{i=0}^{K-1} \left( \text{distance}(i, \alpha) - \frac{num(\alpha)}{\text{den}} peakLag[i] \right)^2 \qquad [13]$$

Note that num/den forms a scale factor that minimizes the MSE. Given a sufficiently dense sequence of azimuths:

$$a_n = 2\pi n/N, \ n=0 \text{ to } N-1 \qquad [14]$$

the device 110 may compute the MSE for each azimuth and locate the minimum value. In some examples, the device 110 may compare the minimum value to a threshold value mseTH. For example, if the minimum value is below the threshold value, the device 110 may associate the corresponding azimuth value with the wall. However, if the minimum error is above the threshold value mseTH, the device 110 may determine that no solution is found and associate a current audio frame with a low confidence value (e.g., weak sample). For example, the low confidence value indicates that the distance vector is not a good fit to the geometry of the microphone array and is likely to be corrupted by noise and/or measurement errors. The number of azimuths for error evaluation (N) is selected as a trade-off between computational cost and the desired precision.

Figure 7:
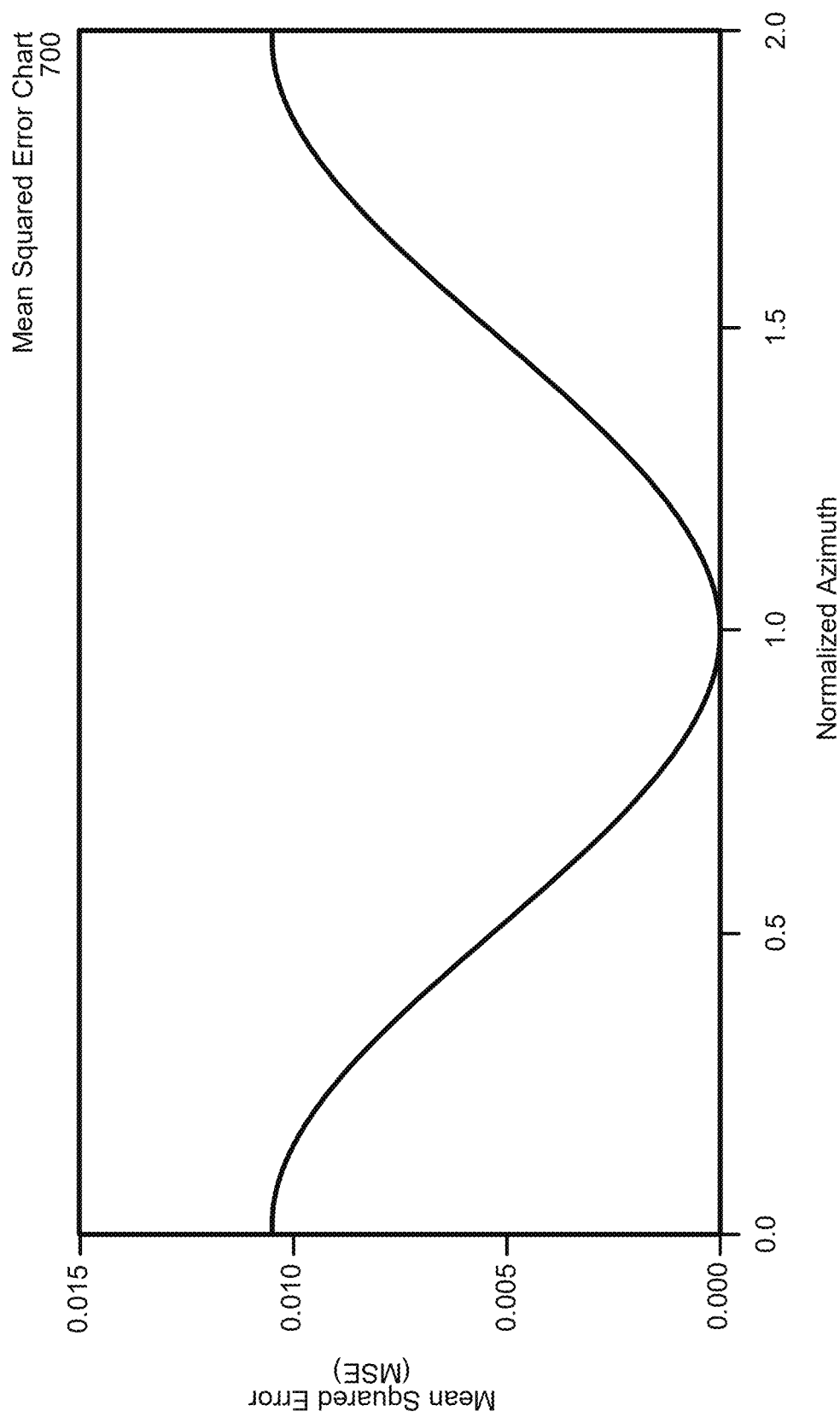
FIG. 7 illustrates an example of an error curve according to embodiments of the present disclosure.

FIG. 7 illustrates an example of an error curve according to embodiments of the present disclosure. As illustrated in FIG. 7, mean squared error chart 700 illustrates an example of an MSE curve, with MSE values represented along a vertical axis and azimuth values represented along a horizontal axis (e.g., normalized azimuth values in the range [0, 2]). In the example illustrated in FIG. 7, a minimum value of the MSE curve corresponds to a first azimuth value (e.g., 1.0), which corresponds to $\pi$ or 180°. Thus, the device 110 may determine an MSE value between the distance vector derived from the autocorrelation sequences (e.g., distance vector data 425) and the reference distance values for each azimuth value.

Using the techniques described above, the device 110 may process multichannel audio signals on a frame-by-frame basis to generate wall direction estimates (e.g., estimated wall directions). In some examples, a single audio frame may have a duration of 8 ms, which corresponds to 128 samples using a first sampling rate (e.g., 16 kHz sampling rate). However, the disclosure is not limited thereto and the sampling rate may vary without departing from the disclosure.

In some examples, the device 110 may store flag values to indicate whether an audio sample corresponds to a strong reflection or a weak reflection. For example, the device 110 may distinguish between strong samples and weak samples using a reflection flag (e.g., strongReflection flag). Thus, if the current audio frame has strong reflective components, the device 110 may initialize the reflection flag to a first binary value (e.g., 1) to indicate strong reflection, whereas if the current audio frame has weak reflective components, the device 110 may set the reflection flag to a second binary value (e.g., 0) to indicate weak reflection.

Additionally or alternatively, the device 110 may distinguish between strong samples and weak samples using confidence values and/or a confidence flag. For example, the device 110 may associate strong samples with a high confidence value (e.g., confidence flag set to the first binary value) and may associate weak samples with a low confidence value (e.g., confidence flag set to the second binary value), although the disclosure is not limited thereto. The disclosure is not limited thereto, however, and in other examples the device 110 may associate azimuth values with the strong samples and may associate weak samples with a fixed value indicating that the current audio frame is not associated with an azimuth value. For example, the azimuth values may be in a normalized range [0, 2], while the fixed value may be a predetermined value outside of the normalized range (e.g., −1 or 3). Thus, the device 110 determines that any audio frame associated with an azimuth value corresponds to a strong sample, whereas any audio frame that is not associated with an azimuth value (e.g., associated with the fixed value) corresponds to a weak sample.

At each frame, the device 110 may calculate autocorrelation sequences for each channel and locate peaks represented in the autocorrelation sequences, leading to the two sequences peakLag[i] and peakCorr[i], for i=0 to K−1. When no reflective surface is in the vicinity of the device 110, a peak might not be present, may be too weak to detect (e.g., near-zero correlation values), and/or the like. In some examples, the device 110 may determine whether a peak is absent or weak based on whether a corresponding correlation value satisfies a condition (e.g., is below an absolute or relative threshold value), although the disclosure is not limited thereto. If a peak is absent in any channel, the current audio frame is considered to be related to weak reflection (e.g., strongReflection set to 0).

The mean autocorrelation sum is calculated with $$autoSum = \frac{1}{K}\sum_{i=0}^{K-1} peakCorr[i] \qquad [15]$$

If the mean autocorrelation sum is below a threshold value (e.g., autoSum>aTH), where the threshold value aTH is a chosen threshold to decide whether reflection is strong, the device 110 may proceed to the next step. Otherwise, the current audio frame may be considered to be related to weak reflection (e.g., strongReflection is set to 0).

As part of performing error minimization, the device 110 may initialize the MSE to a chosen large value (e.g., MSE_LARGE). If the reflection flag indicates a strong reflection (e.g., strongReflection=1), the device 110 may proceed to minimizing the error between distance vector (e.g., peakLag) and the reference distance data, as described in greater detail above, resulting in a minimum MSE value and corresponding azimuth value. If the minimum MSE value is above a threshold value (e.g., MSE>mseTH), the current audio frame may be considered to be related to weak reflection (e.g., strongReflection is set to 0).

The device 110 may store samples to a buffer component. For example, the device 110 may store four parameters to the buffer component, which may be a circular buffer that stores a fixed number of samples and replaces the oldest sample with each new sample. In some examples, the buffer component may store four parameters: 1) the mean autocorrelation sum (e.g., autoSum), 2) azimuth value (e.g., $\alpha_w$), 3) minimum MSE value, and/or 4) strong reflection flag (e.g., strongReflection). A length of the buffer may vary based on design parameters and can be adjusted for optimal operation.

The device 110 may determine a final wall azimuth associated with the current audio frame by analyzing the contents of the buffer component. Assuming that the relative positions of the wall and the microphone array do not change rapidly, the device 110 may use current and past samples to obtain a more stable outcome. For example, the device 110 may determine the final wall azimuth value by:

Calculating the percentage of strong samples inside the buffer. For example, if the percentage is below a threshold value, the device 110 may determine that there is no result for the current audio frame.

Calculating the median or mean of the azimuth values stored in the buffer component for all strong frames. In some examples, the device 110 may add time weighting in the process where more recent values have higher weights; in addition, some form of outlier elimination can be incorporated. Thus, the device 110 may associate the final azimuth value (e.g., median or mean value) as the azimuth estimate of the current audio frame.

Figure 8:
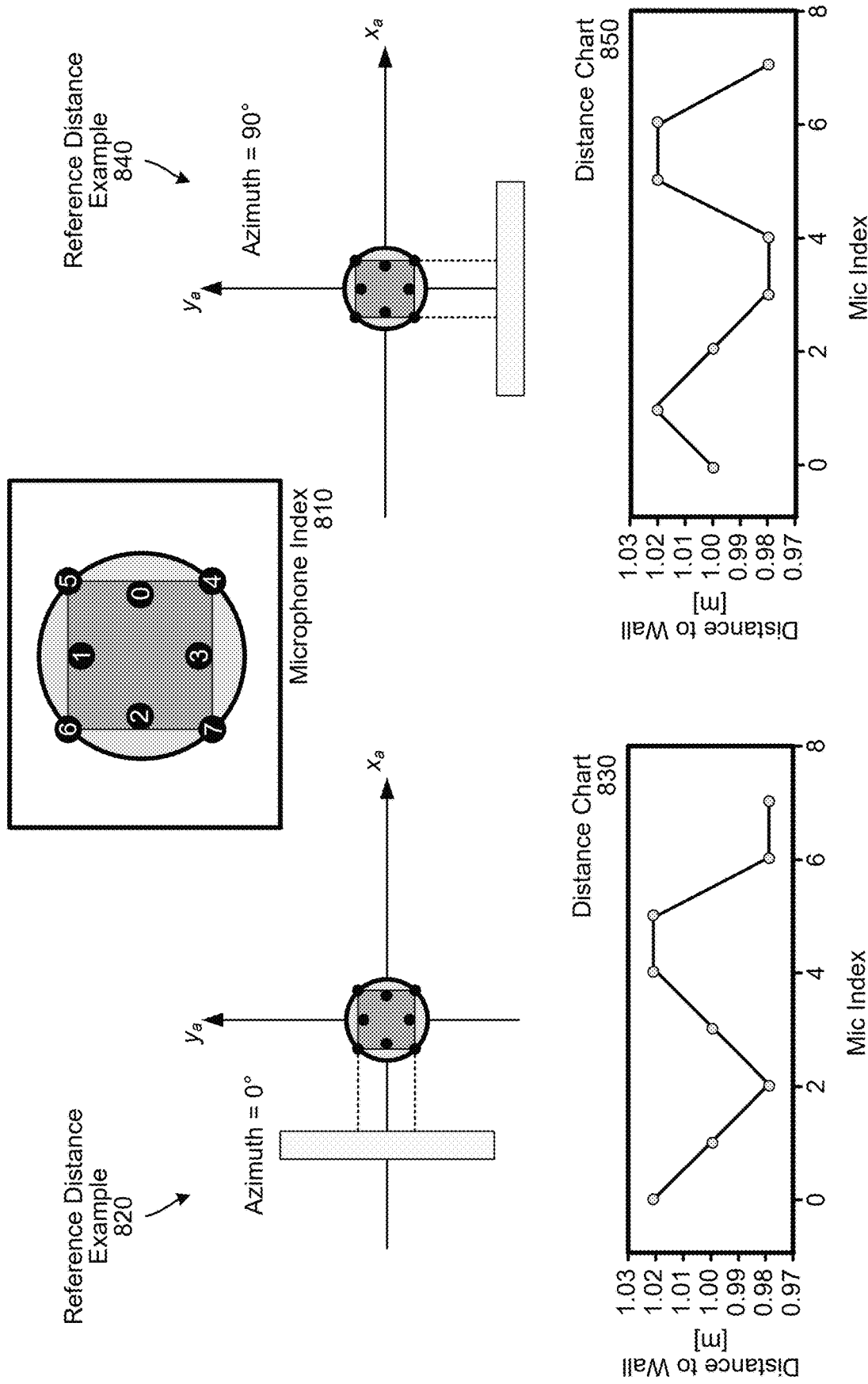
FIG. 8 illustrates examples of reference configurations and corresponding distance charts according to embodiments of the present disclosure.

FIG. 8 illustrates examples of reference configurations and corresponding distance charts according to embodiments of the present disclosure. In some examples, the device 110 may include eight microphones 112 in a fixed configuration, illustrated as microphone index 810. As illustrated in FIG. 8, a first reference distance example 820 illustrates examples of first distance values in a first distance chart 830 when the device 110 is in a first configuration relative to the wall (e.g., azimuth=0°). Similarly, a second reference distance example 840 illustrates examples of second distance values in a second distance chart 850 when the device 110 is in a second configuration relative to the wall (e.g., azimuth=90°). As illustrated in FIG. 8, the device 110 may use the first distance values and/or the second distance values to determine a wall direction estimate corresponding to the current configuration of the device 110.

Figure 9:
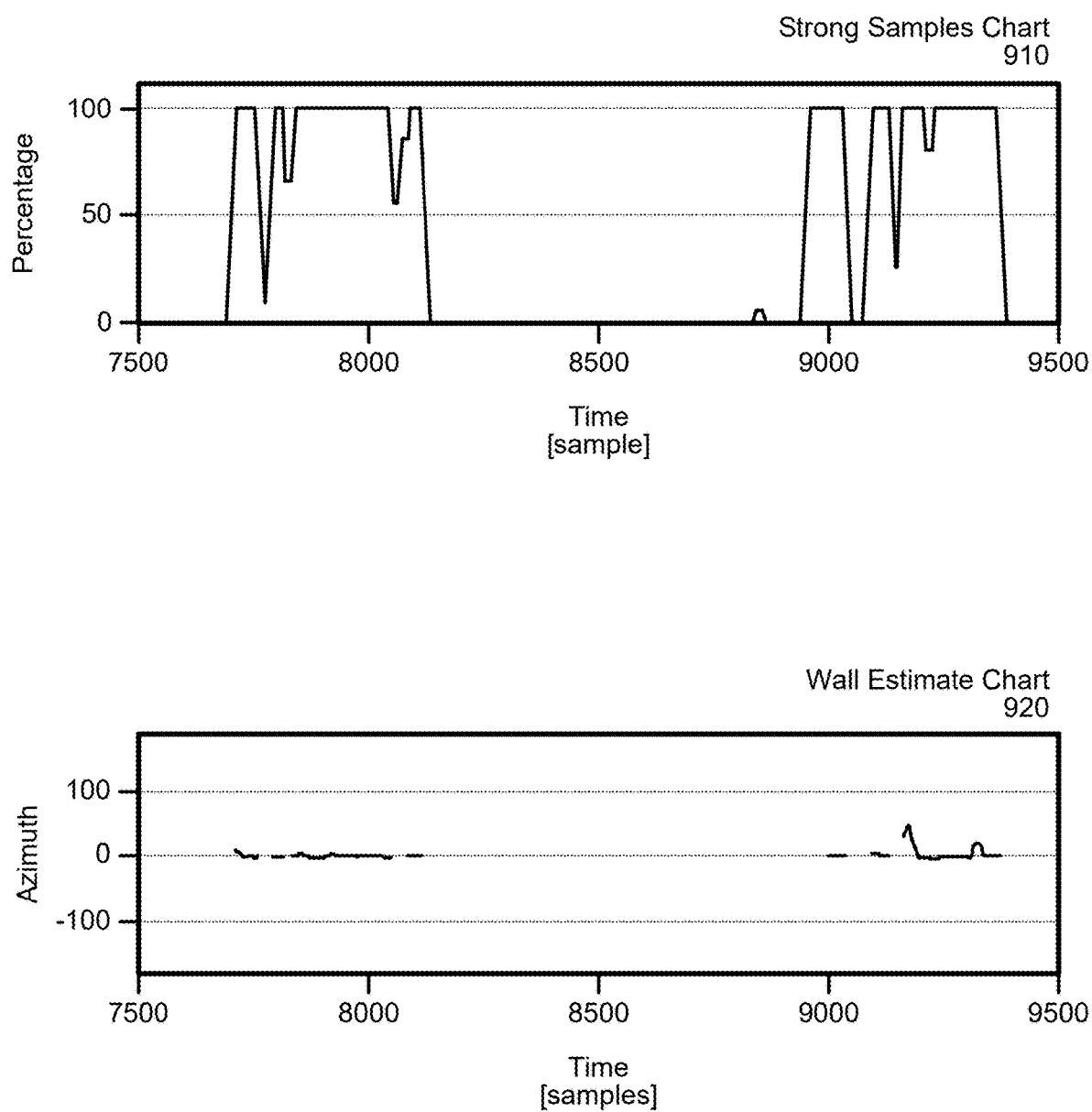
FIG. 9 illustrates examples of a strong samples chart and a corresponding wall estimate chart according to embodiments of the present disclosure.

FIG. 9 illustrates examples of a strong samples chart and a corresponding wall estimate chart according to embodiments of the present disclosure. As described above, in some examples the device 110 may store flag values to indicate whether an audio sample corresponds to a strong reflection or a weak reflection. For example, the device 110 may distinguish between strong samples and weak samples using a reflection flag (e.g., strongReflection flag). Thus, if the current audio frame has strong reflective components, the device 110 may initialize the reflection flag to a first binary value (e.g., 1) to indicate strong reflection, whereas if the current audio frame has weak reflective components, the device 110 may set the reflection flag to a second binary value (e.g., 0) to indicate weak reflection.

Figure 12:
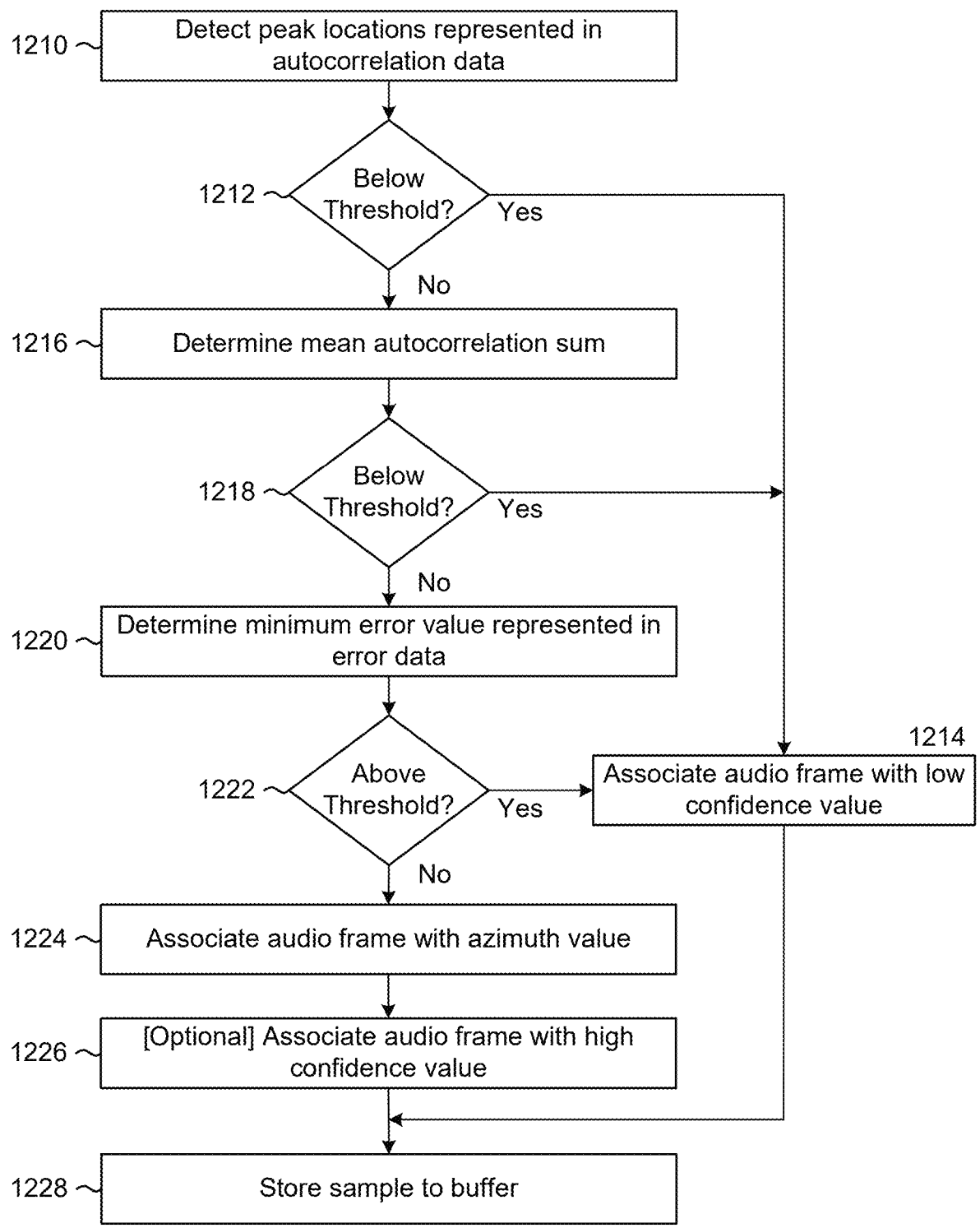
FIG. 12 is a flowchart conceptually illustrating an example method for performing wall direction heuristics according to embodiments of the present disclosure.

Examples of distinguishing between strong samples and weak samples (e.g., audio frames associated with low confidence values) are illustrated in FIG. 12 and described in greater detail below. For example, the device 110 may distinguish between strong samples and weak samples based on one or more parameters, such as peak locations represented in the distance vector data 425, a mean autocorrelation sum associated with the distance vector data 425, and/or a minimum error value determined during error minimization.

When the device 110 determines that peak locations are not represented in the autocorrelation data, the device 110 may determine that the current audio frame corresponds to a weak sample. In some examples, the device 110 may determine that a peak location for an individual microphone channel is not represented in the distance vector data 425 and may set the reflection flag to indicate that the current audio frame corresponds to a weak reflection. In other examples, the device 110 may determine a plurality of correlation values corresponding to the distance vector data 425 (e.g., a peak correlation value for each individual autocorrelation sequence) and may compare the plurality of correlation values to a correlation threshold value. For example, the device 110 may determine that a peak correlation value for an individual microphone channel is below the correlation threshold value and may set the reflection flag to indicate that the current audio frame corresponds to a weak reflection.

In some examples, the device 110 may determine a mean autocorrelation sum for a current audio frame and may distinguish between strong samples and weak samples based on the mean autocorrelation sum. For example, the mean autocorrelation sum is a high value when the signature of wall reflection is strong during active speech intervals. Thus, the device 110 may determine that the mean autocorrelation sum is below an autocorrelation threshold value and may set the reflection flag to indicate that the current audio frame corresponds to a weak reflection.

During active speech intervals that exhibit high energy, minimum MSE values are typically low. In contrast, minimum MSE values are high during noisy intervals with low energy. For example, when the minimum MSE value is low, a corresponding azimuth value may correspond to the true direction of the wall relative to the device 110. In contrast, when the minimum MSE value is high, a corresponding azimuth value may be inaccurate and/or an output may correspond to randomized wall azimuths. In some examples, the device 110 may distinguish between weak samples and strong samples using the minimum MSE value. For example, the device 110 may determine that the current audio frame corresponds to a weak sample if the minimum MSE value is above an error threshold value, such that strong samples are associated with minimum MSE values below the threshold value. Thus, the device 110 may determine that the minimum MSE value is above the error threshold value and may set the reflection flag to indicate that the current audio frame corresponds to a weak reflection.

As described above, the device 110 may store a fixed number of samples in a buffer component (e.g., circular buffer) and use these samples to determine a final azimuth value. For example, if at least a minimum number of samples stored in the buffer component correspond to strong samples, the device 110 may determine a final azimuth value using these strong samples and associate the final azimuth value with the current audio frame. In some examples, a strong sample corresponds to an audio frame associated with an azimuth value, whereas a weak sample corresponds to an audio frame that is not associated with an azimuth value and/or is indicated as a weak sample using some other indicator (e.g., low confidence value). To illustrate an example, FIG. 9 illustrates strong samples chart 910, which indicates a percentage of strong samples included in the buffer component (e.g., vertical axis) as a function of frame index (e.g., horizontal axis). For example, the device 110 may determine a first number of strong samples stored in the buffer component and may calculate the percentage value by dividing the first number of strong samples by a second number of total samples stored in the buffer component.

During active speech intervals, the percentage values represented in the strong samples chart 910 approach a maximum value (e.g., 100%), whereas the percentage values vary wildly and even approach a minimum value (e.g., 0%) during non-speech intervals. In some examples, the device 110 may generate the final azimuth value only when the percentage of strong samples exceeds a strong threshold value (e.g., 80%), although the disclosure is not limited thereto. For example, when more than 80% of the total number of samples stored in the buffer component correspond to strong samples, the device 110 may determine a final azimuth value using these strong samples and may associate the final azimuth value with the current audio frame. However, if fewer than 80% of the total samples correspond to strong samples, the device 110 may determine that no result was reached and/or not associate the current audio frame with a final azimuth value without departing from the disclosure.

As illustrated in FIG. 9, wall estimate chart 920 indicates azimuth values determined by the device 110 over time. For example, the wall estimate chart 920 illustrates a wall azimuth estimate (e.g., vertical axis) as a function of frame index (e.g., horizontal axis). Portions of the wall estimate chart 920 that do not indicate an azimuth value correspond to weak samples and/or when a percentage value associated with the current audio frame is below the strong threshold value described above.

Figure 10:
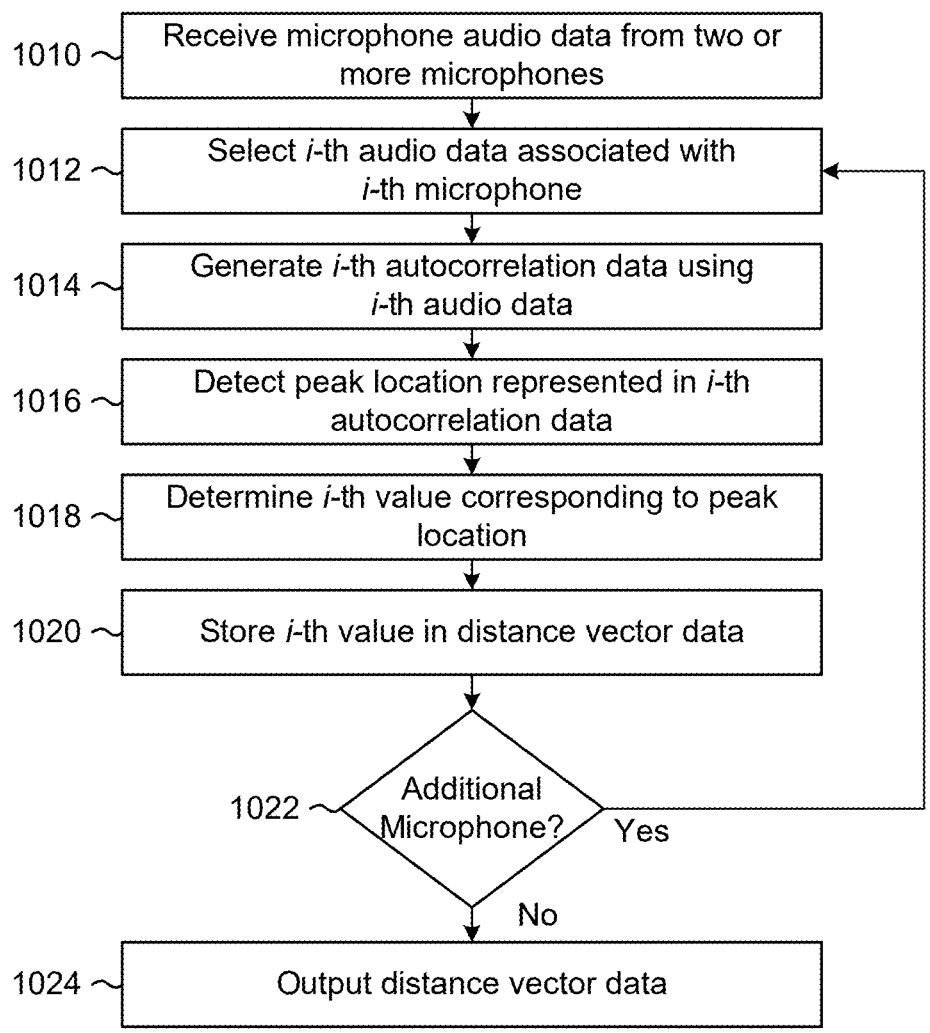
FIG. 10 is a flowchart conceptually illustrating an example method for determining distance vector data according to embodiments of the present disclosure.

FIG. 10 is a flowchart conceptually illustrating an example method for determining distance vector data according to embodiments of the present disclosure. As illustrated in FIG. 10, the device 110 may receive (1010) microphone audio data from two or more microphones and may select (1012) i-th audio data associated with the i-th microphone. The device 110 may generate (1014) i-th autocorrelation data using the i-th audio data, detect (1016) a peak location represented in the i-th autocorrelation data, determine (1018) a i-th value corresponding to the peak location, and store (1020) the i-th value in distance vector data, as described in greater detail above with regard to FIG. 4.

The device 110 may determine (1022) whether there is an additional microphone and, if so, may loop to step 1012 and repeat steps 1012-1020 for the additional microphone channel. If the device 110 determines that there is not an additional microphone, the device 110 may output (1024) the distance vector data.

While FIG. 10 illustrates the device 110 separately processing the i-th audio data associated with the i-th microphone, this is intended for ease of illustration and the disclosure is not limited thereto. Thus, while FIG. 10 illustrates the steps being performed iteratively for each microphone channel, in some examples the device 110 may perform some of the steps in parallel for each microphone channel without departing from the disclosure. For example, the device 110 may perform the autocorrelation operations in step 1014 at substantially the same time for multiple microphone channels, enabling the device 110 to determine the autocorrelation sum $S_{sum}[k]$ illustrated in Equation [8]. As the autocorrelation sum $S_{sum}[k]$ is used to normalize the autocorrelation sequences in order to cancel a contribution of the original signal and detect the peaks, there is some interdependency between the autocorrelation operations.

Figure 11:
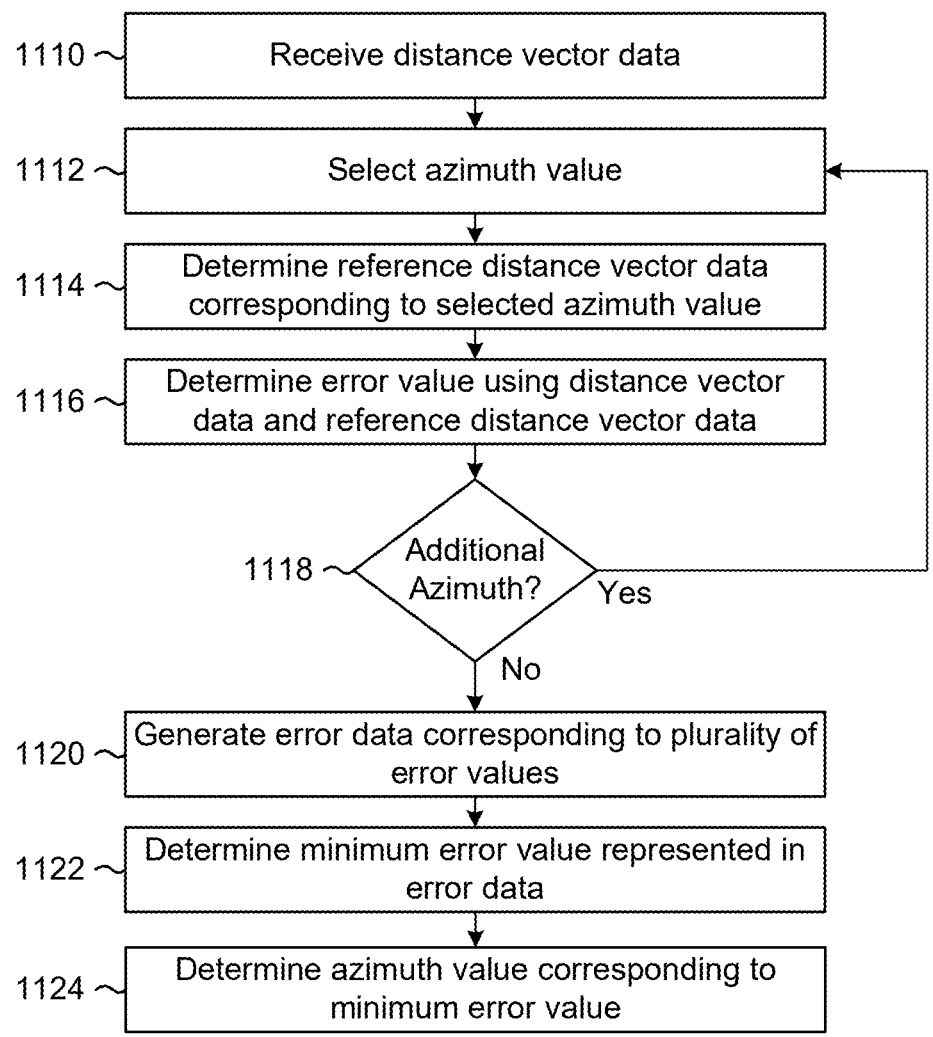
FIG. 11 is a flowchart conceptually illustrating an example method for performing wall direction estimation according to embodiments of the present disclosure.

FIG. 11 is a flowchart conceptually illustrating an example method for performing wall direction estimation according to embodiments of the present disclosure. As illustrated in FIG. 11, the device 110 may receive (1110) distance vector data, such as the distance vector data generated in FIG. 10.

The device 110 may select (1112) an azimuth value, determine (1114) reference distance vector data corresponding to the selected azimuth value, and determine (1116) an error value using the distance vector data and the reference distance vector data. For example, the device 110 may determine an error value indicating an error (e.g., difference) between a current distance vector (e.g., distance vector data) and an individual reference distance vector associated with the selected azimuth value, although the disclosure is not limited thereto.

As used herein, an individual reference distance vector may correspond to a set of reference distance values associated with a specific azimuth value. For example, if the device 110 distinguishes between a first number of azimuth values (e.g., 360 values, for a resolution of 1°), the device 110 may determine the first number of reference distance vectors, with each individual reference distance vector including a reference distance value for each of the microphones 112 included in the microphone array. In some examples, the device 110 may store reference distance data corresponding to a plurality of reference distance vectors, such that the device 110 retrieves a reference distance vector corresponding to the selected azimuth value from a portion of the reference distance data. However, the disclosure is not limited thereto, and in other examples the device 110 may store reference distance data corresponding to reference distance curves, as described above with regard to FIG. 6. For example, the device 110 may determine the plurality of reference distance vectors based on the reference distance curves, such that the device 110 determines a reference distance vector corresponding to the selected azimuth value using the reference distance curves.

While FIG. 11 illustrates the device 110 performing step 1114 to determine the reference distance vector data and then performing step 1116 to determine the error value, the disclosure is not limited thereto. In some examples, the device 110 may perform a single step to determine the error value associated with the distance vector data and the selected azimuth value without departing from the disclosure. Additionally or alternatively, while step 1116 refers to the device 110 determining the error value (e.g., mean squared error), the disclosure is not limited thereto and the device 110 may determine that the distance vector data corresponds to a selected azimuth value using other techniques without departing from the disclosure.

The device 110 may determine (1118) whether there is an additional azimuth value and, if so, may loop to step 1112 and repeat steps 1112-1116 for the additional azimuth value. If the device 110 determines that there isn't an additional azimuth value to process, the device 110 may generate (1120) error data corresponding to the plurality of error values determined in step 1116 (e.g., individual error value for each azimuth value), may determine (1122) a minimum error value represented in the error data, and may determine (1124) an azimuth value corresponding to the minimum error value. For example, the device 110 may perform the steps described above with regard to the error minimization component 430 and/or FIG. 7.

FIG. 12 is a flowchart conceptually illustrating an example method for performing wall direction heuristics according to embodiments of the present disclosure. As illustrated in FIG. 12, the device 110 may detect (1210) peak locations represented in the autocorrelation data and may determine (1212) whether a correlation value associated with the peak locations is below a correlation threshold value. If so, the device 110 may associate (1214) a current audio frame with a low confidence value. However, the disclosure is not limited thereto and the device 110 may associate the current audio frame with a weak sample indicator and/or the like without departing from the disclosure.

The device 110 may determine (1216) a mean autocorrelation sum associated with the peak locations (e.g., using Equation [15]) and may determine (1218) whether the mean autocorrelation sum is below an autocorrelation threshold value. If so, the device 110 may perform step 1214 and associate the current audio frame with the low confidence value and/or weak sample indicator.

The device 110 may determine (1220) a minimum error value represented in the error data and may determine (1222) whether the minimum error value is above an error threshold value. If so, the device 110 may perform step 1214 and associate the current audio frame with the low confidence value and/or weak sample indicator.

If the device 110 determines that the minimum error value is above the error threshold value, the device 110 may associate (1224) the audio frame with an azimuth value corresponding to the minimum error value and may optionally associate (1226) the audio frame with a high confidence value and/or strong sample indicator. Whether the current audio frame is associated with the high confidence value in step 1226 or the low confidence value in step 1214, the device 110 may store (1228) a sample corresponding to the current audio frame in a buffer component.

Figure 13:
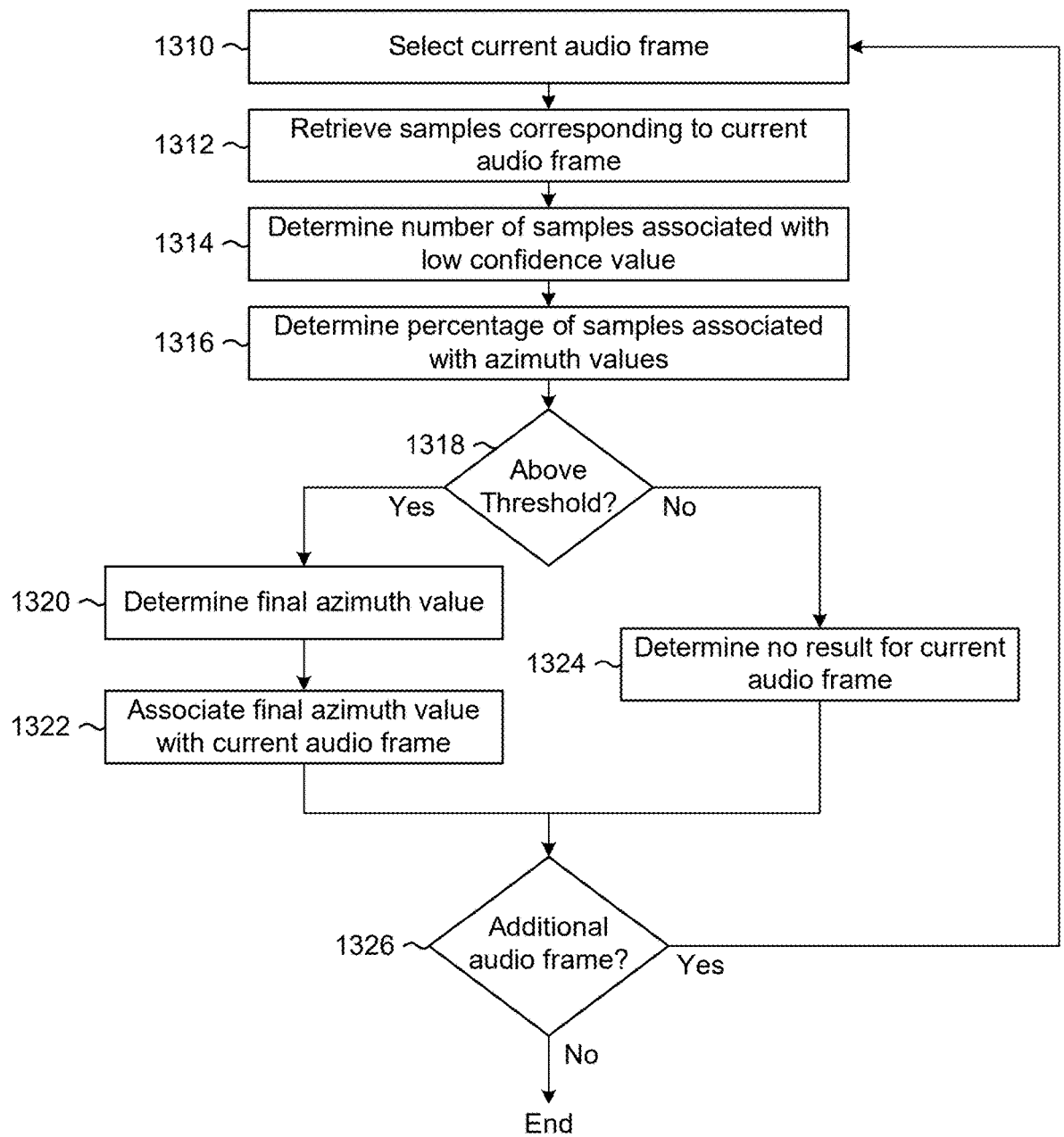
FIG. 13 is a flowchart conceptually illustrating an example method for performing wall direction estimation according to embodiments of the present disclosure.

FIG. 13 is a flowchart conceptually illustrating an example method for performing wall direction estimation according to embodiments of the present disclosure. As illustrated in FIG. 13, the device 110 may select (1310) a current audio frame, retrieve (1312) samples corresponding to the current audio frame (e.g., plurality of samples stored in the buffer component), determine (1314) a number of samples associated with the low confidence value (e.g., weak sample indicator), and determine (1316) a percentage of the plurality of samples that are associated with azimuth values. As described above, in some examples the buffer component only associates an azimuth value with a strong sample, such that a weak sample is either not associated with an azimuth value (e.g., entry for azimuth value is blank) or is associated with a fixed value indicating that the weak sample corresponds to a weak reflection (e.g., entry for azimuth value is outside the range of [0, 2]). Thus, by determining the number of samples associated with the low confidence value, the device 110 may determine a percentage of the plurality of samples that are not associated with an azimuth value in order to determine the percentage of the plurality of samples that are associated with an azimuth value.

The device 110 may determine (1318) whether the percentage is above a strong threshold value and, if so, may determine (1320) a final azimuth value and associate (1322) the final azimuth value with the current audio frame. For example, the device 110 may determine the final azimuth value using the azimuth values stored in the buffer component (e.g., strong samples), such as by taking a mean, median, weighted average, and/or the like. If the device 110 determines that the percentage is below the strong threshold value, the device 110 may determine (1324) that there is no result for the current audio frame (e.g., no azimuth value). The device 110 may determine (1326) whether there is an additional audio frame, and if so, may loop to step 1310 and repeat steps 1310-1324 for the additional audio frame.

As described above, the device 110 may generate wall estimate data indicating a direction and/or distance associated with one or more walls. Additionally or alternatively, the device 110 may generate wall estimate data that indicates an acoustic environment classification without departing from the disclosure. For example, the device 110 may perform wall direction estimation to determine whether the device 110 is in proximity to any walls. Based on the number of walls in proximity to the device 110, the device 110 may determine an acoustic environment classification. Examples of acoustic environment classifications include a free classification (e.g., zero walls in proximity), a wall classification (e.g., one wall in proximity), a corner classification (e.g., two walls in proximity), and/or the like without departing from the disclosure.

If the device 110 is located at a distance from any wall, the device 110 may associate the acoustic environment with a free classification. For example, the free classification corresponds to the device 110 being positioned in the open away from any acoustically reflective surfaces, such that the device 110 determines that an acoustically reflective surface was not detected in any direction relative to the device.

If the device 110 is located in proximity to a single wall, the device 110 may associate the acoustic environment with a wall classification. For example, the wall classification corresponds to the device 110 being positioned in proximity to (e.g., next to, within a certain distance of, below a distance threshold from, etc.) a single acoustically reflective surface, such that the device 110 determines that a single acoustically reflective surface was detected in a single direction.

If the device 110 is located in proximity to two walls, the device 110 may associate the acoustic environment with a corner classification. a corner classification 930 that corresponds to the device 110 being positioned in proximity to (e.g., next to, within a certain distance of, below a distance threshold from, etc.) two acoustically reflective surfaces, such that the device 110 determines that two acoustically reflective surfaces were detected in two separate directions.

While The example above illustrates three acoustic environment classifications, this is intended for ease of illustration and the disclosure is not limited thereto. Instead, the device 110 may generate and/or select from a plurality of acoustic environment classifications without departing from the disclosure. For example, a "cabinet classification" may correspond to the device 110 being positioned in a cabinet, which the device 110 may detect by determining that the device 110 is positioned in a first corner classification along a horizontal plane and a second corner classification along a vertical plane.

Additionally or alternatively, while the examples described above describe the device 110 determining the corner classification based on estimated distances to the physical walls, the disclosure is not limited thereto. In some examples, the device 110 may determine the acoustic environment classification without estimating distance(s) to the physical walls. Therefore, the device 110 may distinguish between different corner classifications without estimating the distance(s). For example, the device 110 may distinguish between different corner classifications based on a relative power of the reflections, a time delay associated with the reflections, and/or any other techniques known to one of skill in the art without departing from the disclosure.

In some examples, the device 110 may perform the acoustic wall direction estimation using audible sounds, such as audio signals within a human hearing range (e.g., 20 Hz-20 kHz), although the disclosure is not limited thereto. In other examples, the device 110 may perform acoustic wall direction estimation using ultrasonic sounds (e.g., sound waves with a frequency above the upper limit of human hearing) without departing from the disclosure. For example, the sound source may generate the direct sound using higher frequency components (e.g., 30-40 kHz), although the disclosure is not limited thereto.

In some examples, the microphones 112 may be configured to detect ultrasonic sounds. For example, a traditional microphone array used to capture human speech may have a first spacing (e.g., microphones 112 are spaced apart 22 mm, although the disclosure is not limited thereto). In contrast, an ultrasonic microphone array used to capture ultrasonic sounds may have a second spacing (e.g., microphones 112 are spaced apart 2.2 mm). However, the disclosure is not limited thereto and the device 110 may capture ultrasonic sounds using a single microphone 112 without departing from the disclosure.

While the examples described above refer to the device 110 performing wall direction estimation based on an active sound source that is independent from the device 110, the disclosure is not limited thereto. In some examples, the device 110 may cause an external loudspeaker to emit audible sounds and may capture the reflected sound waves using the microphones 112 without departing from the disclosure. In other examples, the device 110 may perform wall direction estimation using a transducer or other sensor without departing from the disclosure.

Figure 14:
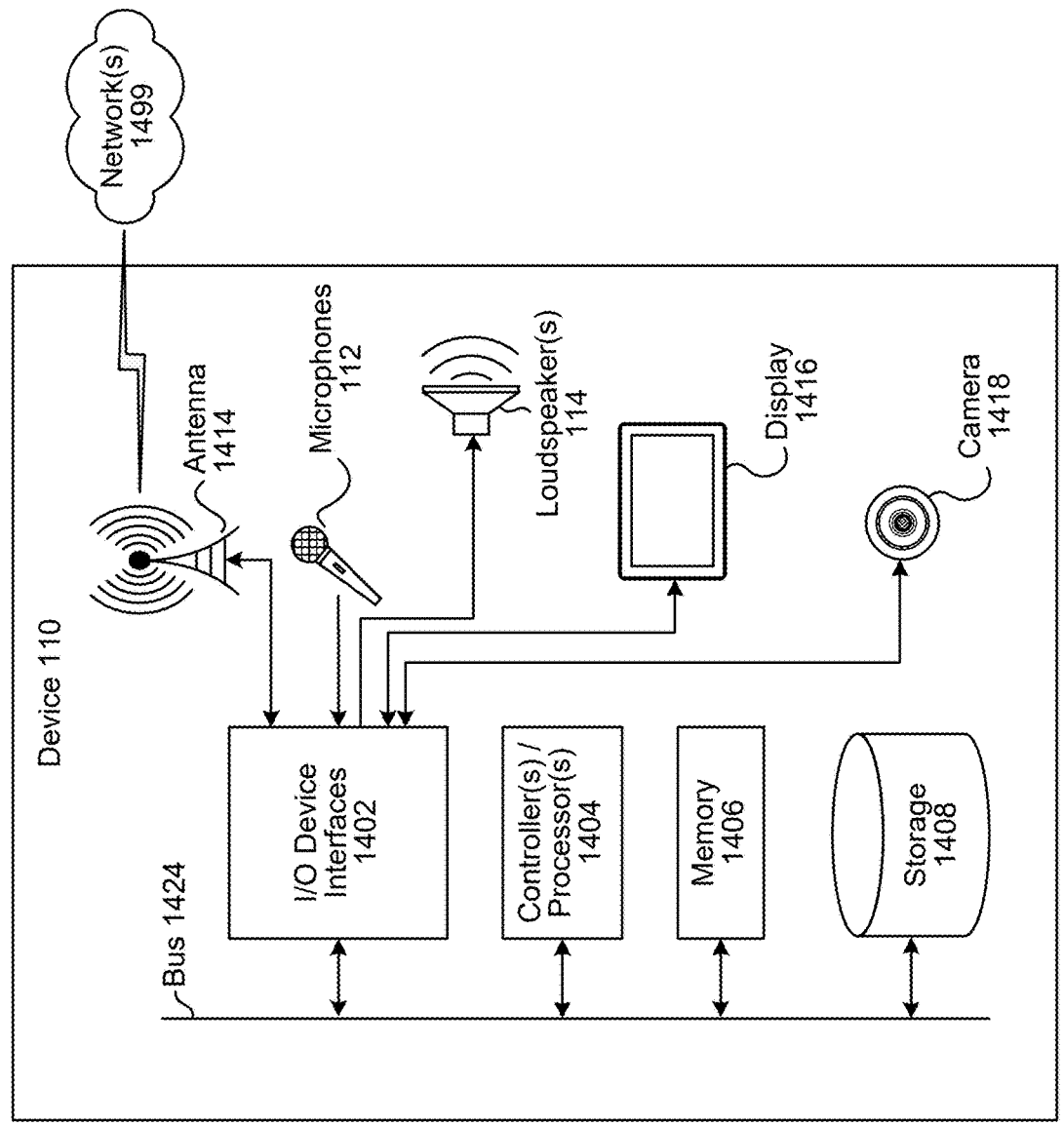
FIG. 14 is a block diagram conceptually illustrating example components of a system for determining a distance and/or direction of an acoustically reflective surface according to embodiments of the present disclosure.

FIG. 14 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 1412. The audio output device may be integrated into the device 110 or may be separate. In some examples the device 110 may include a display 1416, but the disclosure is not limited thereto and the device 110 may not include a display or may be connected to an external device/display without departing from the disclosure.

The device 110 may include one or more controllers/processors (1404), which may each include a central processing unit (CPU) for processing data and computer-readable instructions, and a memory (1406) for storing data and instructions of the respective device. The memory (1406) may individually include volatile random access memory (RAM), non-volatile read only memory (ROM), non-volatile magnetoresistive memory (MRAM), and/or other types of memory. The device 110 may also include a data storage component (1408) for storing data and controller/processor-executable instructions. Each data storage component (1408) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (1402).

Computer instructions for operating the device 110 and its various components may be executed by the respective device's controller(s)/processor(s) (1404), using the memory (1406) as temporary "working" storage at runtime. A device's computer instructions may be stored in a non-transitory manner in non-volatile memory (1406), data storage component (1408), or an external device(s). Alternatively, some or all of the executable instructions may be embedded in hardware or firmware on the respective device in addition to or instead of software.

The device 110 includes input/output device interfaces (1402). A variety of components may be connected through the input/output device interfaces (1402), such as the microphones 112, the loudspeaker(s) 1412, and/or the display 1416. The input/output interfaces (1402) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 1102 may include D/A converters for converting output audio data into an analog current to drive the loudspeaker(s) 1412, if the loudspeaker(s) 1412 are integrated with or hardwired to the device 110. However, if the loudspeaker(s) 1412 are independent, the D/A converters will be included with the loudspeaker(s) 1412 and may be clocked independent of the clocking of the device 110 (e.g., conventional Bluetooth loudspeakers).

Additionally, the device 110 may include an address/data bus (1424) for conveying data among components of the respective device. Each component within a device 110 may also be directly connected to other components in addition to (or instead of) being connected to other components across the bus (1424).

Referring to FIG. 14, the device 110 may include input/output device interfaces 1402 that connect to a variety of components such as an audio output component such as loudspeaker(s) 1412, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content and/or a camera 1418 to capture image data, although the disclosure is not limited thereto. The input/output device interfaces (1402) may also include an interface for an external peripheral device connection such as universal serial bus (USB), FireWire, Thunderbolt or other connection protocol.

The device 110 may connect to one or more network(s) 1499 through either wired and/or wireless connections. For example, the device 110 may connect to the network(s) 1499 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 1499 may include a local or private network or may include a wide network such as the Internet.

As illustrated in FIG. 14, the input/output device interfaces 1402 may connect to the network(s) 1499 via antenna(s) 1414. For example, the device 110 may connect to the network(s) 1499 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1499, the system may be distributed across a networked environment. The I/O device interface (1402) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (1402), processor(s) (1404), memory (1406), and/or data storage component (1408) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data including a first representation of an audible sound as detected by a first microphone of a device, the audible sound generated by a sound source and reflected off of an acoustically reflective surface;
   receiving second audio data including a second representation of the audible sound as detected by a second microphone of the device;
   determining first data representing a first correlation between the first audio data and a delayed version of the first audio data;
   determining second data representing a second correlation between the second audio data and a delayed version of the second audio data;
   determining, using the first data, a first value corresponding to a first peak represented in the first data, the first peak corresponding to the first representation of the audible sound;
   determining, using the second data, a second value corresponding to a second peak represented in the second data, the second peak corresponding to the second representation of the audible sound; and
   determining, using the first value and the second value, that a first azimuth value corresponds to the acoustically reflective surface.

2. The computer-implemented method of claim 1, wherein determining that the first azimuth value corresponds to the acoustically reflective surface further comprises:
   determining first vector data corresponding to the acoustically reflective surface, the first vector data including the first value and the second value;
   determining, using reference data, second vector data associated with the first azimuth value;
   determining, using the reference data, third vector data associated with a second azimuth value;
   determining a first error value corresponding to a first difference between the first vector data and the second vector data;
   determining a second error value corresponding to a second difference between the first vector data and the third vector data;
   determining that the first error value is less than the second error value; and
   determining that the first azimuth value corresponds to the acoustically reflective surface.

3. A computer-implemented method, the method comprising:
   determining, using a first microphone of a device, first audio data including a first representation of an audible sound, the audible sound being reflected off an acoustically reflective surface;
   determining, using a second microphone of the device, second audio data including a second representation of the audible sound;
   determining first data representing a first correlation between the first audio data and a delayed version of the first audio data;
   determining second data representing a second correlation between the second audio data and a delayed version of the second audio data;
   determining, using the first data and the second data, vector data, wherein the vector data includes a first value corresponding to the first representation of the audible sound and a second value corresponding to the second representation of the audible sound; and
   determining, using the vector data, direction data corresponding to the acoustically reflective surface.

4. The computer-implemented method of claim 3, wherein determining the vector data further comprises:
- determining that a first peak is represented in the first data within a time interval, the first peak corresponding to the first representation of the audible sound;
- determining that the first peak corresponds to the first value;
- determining that a second peak is represented in the second data within the time interval, the second peak corresponding to the second representation of the audible sound;
- determining that the second peak corresponds to the second value; and
- determining the vector data using the first value and the second value.

5. The computer-implemented method of claim 3, wherein determining the direction data further comprises:
- determining a third value corresponding to a first difference between the vector data and first reference data that is associated with a first azimuth value;
- determining a fourth value corresponding to a second difference between the vector data and second reference data that is associated with a second azimuth value;
- determining that the third value satisfies a condition;
- determining that the third value corresponds to the first azimuth value; and
- determining the direction data using the first azimuth value.

6. The computer-implemented method of claim 3, wherein determining the direction data further comprises:
- determining, using the vector data and reference data, a plurality of error values, wherein the reference data corresponds to a plurality of azimuth values;
- determining that a third value is a minimum value of the plurality of error values;
- determining that the third value exceeds a threshold value;
- determining that the third value corresponds to a first azimuth value of the plurality of azimuth values; and
- determining the direction data using the first azimuth value.

7. The computer-implemented method of claim 3, wherein determining the direction data further comprises:
- determining first distance values corresponding to a first azimuth value;
- determining second distance values corresponding to a second azimuth value;
- determining that the vector data corresponds to the first distance values; and
- determining the direction data using the first azimuth value.

8. The computer-implemented method of claim 3, wherein determining the direction data further comprises:
- determining, using the vector data, a first azimuth value associated with a first sample of a plurality of samples;
- determining that a first number of the plurality of samples satisfy one or more conditions;
- determining that the first number exceeds a threshold value; and
- determining the direction data using the first number of the plurality of samples.

9. The computer-implemented method of claim 3, wherein determining the direction data further comprises:
- determining a plurality of correlation values corresponding to the vector data, wherein the vector data is associated with a first audio frame of a plurality of audio frames;
- determining, using the plurality of correlation values and a threshold value, that the first audio frame does not satisfy a condition; and
- determining the direction data using a first number of the plurality of audio frames that satisfy the condition.

10. The computer-implemented method of claim 3, wherein determining the direction data further comprises:
- determining an average correlation value associated with the vector data, wherein the average correlation value is associated with a first audio frame of a plurality of audio frames;
- based on the average correlation value being below a threshold value, determining that the first audio frame does not satisfy a condition; and
- determining the direction data using a first number of the plurality of audio frames that satisfy the condition.

11. The computer-implemented method of claim 3, further comprising:
- determining, using the first value, a third value indicating a time delay between a third representation of the audible sound in the first audio data and the first representation of the audible sound, wherein the third representation of the audible sound corresponds to direct sound received from a sound source; and
- determining, using the direction data and the third value, a distance value indicating a distance between the device and the acoustically reflective surface.

12. A system comprising:
- at least one processor; and
- memory including instructions operable to be executed by the at least one processor to cause the system to:
  - determine, using a first microphone of a device, first audio data including a first representation of an audible sound, the audible sound being reflected off an acoustically reflective surface;
  - determine, using a second microphone of the device, second audio data including a second representation of the audible sound;
  - determine first data representing a first correlation between the first audio data and a delayed version of the first audio data;
  - determine second data representing a second correlation between the second audio data and a delayed version of the second audio data;
  - determine, using the first data and the second data, vector data, wherein the vector data includes a first value corresponding to the first representation of the audible sound and a second value corresponding to the second representation of the audible sound; and
  - determine, using the vector data, direction data corresponding to the acoustically reflective surface.

13. The system of claim 12, wherein the memory further comprises instructions that, when executed by the at least one processor, further cause the system to:
- determine that a first peak is represented in the first data within a time interval, the first peak corresponding to the first representation of the audible sound;
- determine that the first peak corresponds to the first value;
- determine that a second peak is represented in the second data within the time interval, the second peak corresponding to the second representation of the audible sound;
- determine that the second peak corresponds to the second value; and
- determine the vector data using the first value and the second value.

14. The system of claim 12, wherein the memory further comprises instructions that, when executed by the at least one processor, further cause the system to:
- determine a third value corresponding to a first difference between the vector data and first reference data that is associated with a first azimuth value;
- determine a fourth value corresponding to a second difference between the vector data and second reference data that is associated with a second azimuth value;
- determine that the third value satisfies a condition;
- determine that the third value corresponds to the first azimuth value; and
- determine the direction data using the first azimuth value.

15. The system of claim 12, wherein the memory further comprises instructions that, when executed by the at least one processor, further cause the system to:
- determine, using the vector data and reference data, a plurality of error values, wherein the reference data corresponds to a plurality of azimuth values;
- determine that a third value is a minimum value of the plurality of error values;
- determine that the third value exceeds a threshold value;
- determine that the third value corresponds to a first azimuth value of the plurality of azimuth values; and
- determine the direction data using the first azimuth value.

16. The system of claim 12, wherein the memory further comprises instructions that, when executed by the at least one processor, further cause the system to:
- determine first distance values corresponding to a first azimuth value;
- determine second distance values corresponding to a second azimuth value;
- determine that the vector data corresponds to the first distance values; and
- determine the direction data using the first azimuth value.

17. The system of claim 12, wherein the memory further comprises instructions that, when executed by the at least one processor, further cause the system to:
- determine, using the vector data, a first azimuth value associated with a first sample of a plurality of samples;
- determine that a first number of the plurality of samples satisfy one or more conditions;
- determine that the first number exceeds a threshold value; and
- determine the direction data using the first number of the plurality of samples.

18. The system of claim 12, wherein the memory further comprises instructions that, when executed by the at least one processor, further cause the system to:
- determine a plurality of correlation values corresponding to the vector data, wherein the vector data is associated with a first audio frame of a plurality of audio frames;
- determine, using the plurality of correlation values and a threshold value, that the first audio frame does not satisfy a condition; and
- determine the direction data using a first number of the plurality of audio frames that satisfy the condition.

19. The system of claim 12, wherein the memory further comprises instructions that, when executed by the at least one processor, further cause the system to:
- determine an average correlation value associated with the vector data, wherein the average correlation value is associated with a first audio frame of a plurality of audio frames;
- based on the average correlation value being below a threshold value, determine that the first audio frame does not satisfy a condition; and
- determine the direction data using a first number of the plurality of audio frames that satisfy the condition.

20. The system of claim 12, wherein the memory further comprises instructions that, when executed by the at least one processor, further cause the system to:
- determine, using the first value, a third value indicating a time delay between a third representation of the audible sound in the first audio data and the first representation of the audible sound, wherein the third representation of the audible sound corresponds to direct sound received from a sound source; and
- determine, using the direction data and the third value, a distance value indicating a distance between the device and the acoustically reflective surface.

* * * * *